United States Patent
Kadono et al.

(10) Patent No.: US 9,900,614 B2
(45) Date of Patent: *Feb. 20, 2018

(54) PICTURE DECODING METHOD FOR DECODING CODED PICTURE DATA AND PERFORMING DISTORTION REMOVAL BY COMPARING PIXEL DIFFERENCE VALUES WITH THRESHOLD

(71) Applicant: GODO KAISHA IP BRIDGE 1, Chiyoda-ku, Tokyo (JP)

(72) Inventors: Shinya Kadono, Fukuoka (JP); Sheng Mei Shen, Singapore (SG); Teck Wee Foo, Singapore (SG); Chak Joo Lee, Singapore (SG); Zhong Xue, Singapore (SG)

(73) Assignee: GODO KAISHA IP BRIDGE 1, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/739,541

(22) Filed: Jun. 15, 2015

(65) Prior Publication Data

US 2015/0281731 A1    Oct. 1, 2015

Related U.S. Application Data

(63) Continuation of application No. 11/929,416, filed on Oct. 30, 2007, now abandoned, which is a
(Continued)

(30) Foreign Application Priority Data

Jan. 17, 2002   (JP) ................................. 2002-008859
Apr. 12, 2002   (JP) ................................. 2002-110748
(Continued)

(51) Int. Cl.
*H04N 7/12*        (2006.01)
*H04N 19/567*      (2014.01)
(Continued)

(52) U.S. Cl.
CPC ......... *H04N 19/567* (2014.11); *H04N 19/105* (2014.11); *H04N 19/112* (2014.11);
(Continued)

(58) Field of Classification Search
CPC ..................................................... H04N 19/86
See application file for complete search history.

(56) References Cited

U.S. PATENT DOCUMENTS 6,333,949 B1   4/1988   Nakagawa et al.
5,418,570 A    5/1995   Ueno et al.
(Continued)

FOREIGN PATENT DOCUMENTS

CN   1132978      10/1996
CN   1281617 A     1/2001
(Continued)

OTHER PUBLICATIONS

Extended European Search Report, dated Sep. 29, 2015, in European Divisional Patent Application No. 15163835.0-1908.
(Continued)

*Primary Examiner* — Young Lee
(74) *Attorney, Agent, or Firm* — Greenblum & Bernstein, P.L.C.

(57) ABSTRACT

A picture decoding method is provided for decoding coded picture data. The decoding method includes decoding coded picture data to obtain a first transform block and an adjacent second transform block in a reconstructed picture having a plurality of blocks forming a moving picture image. The decoding method also includes determining whether the first transform block is located inside a motion-compensation
(Continued)

block in which the second transform block is located. The decoding method further includes performing a filtering on pixels in a block boundary between the first and second transform blocks when the first transform block is located outside the motion-compensation block in which the second transform block is located, and performing no filtering on the pixels in the block boundary between the first and second transform blocks when the first transform block is located inside the motion-compensation block in which the second transform block is located.

1 Claim, 34 Drawing Sheets

Related U.S. Application Data continuation of application No. 11/433,464, filed on May 15, 2006, now abandoned, which is a continuation of application No. 10/451,628, filed as application No. PCT/JP02/12488 on Nov. 29, 2002, now Pat. No. 7,095,787.

(60) Provisional application No. 60/333,763, filed on Nov. 29, 2001, provisional application No. 60/333,767, filed on Nov. 29, 2001, provisional application No. 60/394,312, filed on Jul. 9, 2002.

(30) Foreign Application Priority Data

Apr. 26, 2002 (JP) .................................. 2002-127101
Oct. 3, 2002 (JP) .................................. 2002-291264

(51) Int. Cl.
| | |
|---|---|
| *H04N 19/105* | (2014.01) |
| *H04N 19/159* | (2014.01) |
| *H04N 19/176* | (2014.01) |
| *H04N 19/172* | (2014.01) |
| *H04N 19/46* | (2014.01) |
| *H04N 19/61* | (2014.01) |
| *H04N 19/112* | (2014.01) |
| *H04N 19/117* | (2014.01) |
| *H04N 19/136* | (2014.01) |
| *H04N 19/137* | (2014.01) |
| *H04N 19/154* | (2014.01) |
| *H04N 19/157* | (2014.01) |
| *H04N 19/16* | (2014.01) |
| *H04N 19/174* | (2014.01) |
| *H04N 19/82* | (2014.01) |
| *H04N 19/86* | (2014.01) |
| *H04N 19/895* | (2014.01) |
| *H04N 19/124* | (2014.01) |
| *H04N 19/182* | (2014.01) |

(52) U.S. Cl.
CPC ......... *H04N 19/117* (2014.11); *H04N 19/124* (2014.11); *H04N 19/136* (2014.11); *H04N 19/137* (2014.11); *H04N 19/154* (2014.11); *H04N 19/157* (2014.11); *H04N 19/159* (2014.11); *H04N 19/16* (2014.11); *H04N 19/172* (2014.11); *H04N 19/174* (2014.11); *H04N 19/176* (2014.11); *H04N 19/182* (2014.11); *H04N 19/46* (2014.11); *H04N 19/61* (2014.11); *H04N 19/82* (2014.11); *H04N 19/86* (2014.11); *H04N 19/895* (2014.11)

(56) References Cited

U.S. PATENT DOCUMENTS

| | | | |
|---|---|---|---|
| 5,436,665 | A | 7/1995 | Ueno et al. |
| 5,479,211 | A | 12/1995 | Fukuda |
| 5,610,729 | A | 3/1997 | Nakajima |
| 5,654,759 | A | 8/1997 | Augenbraun et al. |
| 5,677,735 | A | 10/1997 | Ueno et al. |
| 5,796,875 | A | 8/1998 | Read |
| 5,819,035 | A | 10/1998 | Devaney et al. |
| 5,946,421 | A | 8/1999 | Kim |
| 5,949,908 | A | 9/1999 | Sugahara |
| 6,104,434 | A | 8/2000 | Nagagawa et al. |
| 6,167,157 | A | 12/2000 | Sugahara |
| 6,188,799 | B1 | 2/2001 | Tan et al. |
| 6,240,135 | B1 | 5/2001 | Kim |
| 6,272,177 | B1 | 8/2001 | Murakami et al. |
| 6,343,100 | B1 | 1/2002 | Fujiwara et al. |
| 6,539,060 | B1 | 3/2003 | Lee et al. |
| 6,724,944 | B1 | 4/2004 | Kalevo et al. |
| 7,043,092 | B1 | 5/2006 | Groliere |
| 7,203,234 | B1 | 4/2007 | Zeng |
| 2001/0036320 | A1 | 11/2001 | Tan et al. |
| 2003/0219073 | A1 | 11/2003 | Lee et al. |
| 2004/0062310 | A1 | 4/2004 | Xue et al. |
| 2007/0092002 | A1 | 4/2007 | Xue et al. |
| 2007/0098066 | A1 | 5/2007 | Xue et al. |
| 2007/0104269 | A1 | 5/2007 | Xue et al. |

FOREIGN PATENT DOCUMENTS

| | | |
|---|---|---|
| CN | 1296703 A | 5/2001 |
| EP | 0631444 | 12/1984 |
| EP | 0631444 | 12/1994 |
| EP | 0714209 | 5/1996 |
| EP | 0714209 A | 5/1996 |
| EP | 0838955 | 4/1998 |
| EP | 1146748 | 10/2001 |
| GB | 2287153 | 9/1998 |
| JP | 4-180381 | 6/1992 |
| JP | 5-308623 | 11/1993 |
| JP | 8-149470 | 6/1996 |
| JP | 8-172628 | 7/1996 |
| JP | 10-150663 | 6/1998 |
| JP | 10-191335 | 7/1998 |
| JP | 10-224790 | 8/1998 |
| JP | 11-004366 | 1/1999 |
| JP | 11-098505 | 4/1999 |
| JP | 11-205792 | 7/1999 |
| JP | 2001-275110 | 10/2001 |
| JP | 2001-320586 | 11/2001 |
| KR | 2000-31028 | 6/2000 |
| WO | 98/27743 | 6/1998 |
| WO | 98/41025 | 9/1998 |
| WO | 99/22509 | 5/1999 |
| WO | 00/49809 | 8/2000 |
| WO | 03/047262 | 6/2003 |
| WO | 03/047267 | 6/2003 |

OTHER PUBLICATIONS

Extended European Search Report, dated Sep. 29, 2015, in European Divisional Patent Application No. 15163853.3-1908.
Foo Teck-Wee et al., "Medium Complexity Loop Filter", 15$^{th}$ Meeting, Pattaya, Thailand Dec. 3-7, 2001, ITU-Telecommunications Standardization Sector, Study Group 16, Question 6, Video Coding Experts Group (VCEG), Document VCEG-O50, Generated Nov. 25, 2001, XP030003383A.
U.S. Appl. No. 11/928,517 to XUE et al., filed October 30, 2007.
Brazilian Office Action, dated Oct. 7, 2016, by the Brazilian Patent Office (i.e., the Brazilian Industrial Property Institute (INPI)) in the corresponding Brazilian Patent Application No. PI0206777-3.
A publication entitled "H.26L Test Model Long Tern No. 8 (TML-8) Drafto," ITU-T Telecommunication Stanclardization Sector, Apr. 2, 2001, pp. 1-54.

(56) References Cited

OTHER PUBLICATIONS

An article by Plompen et al., entitled "Motion Video Coding in CCITT SG XV—The Video Source Coding," published in "IEEE Global Telecommunications Conference & Exhibition, Hollywood, Florida, Nov. 28, 1988 to Dec. 1, 1988, Communications for the Information Age," vol. 2, Nov. 28, 1988, pp. 997-1004.

An article by Lee et al., entitled "Loop-filtering and Post-filtering for Low Bit-rates Moving Picture Coding", published in Image Processing, 1999, ICIP Proceedings, 1999 International Conference in Kobe, Japan, Oct. 24-28, 1999, Oct. 24, 1999, pp. 94-98.

An article by Buley et al., entitled "Inter/Intraframe Coding of Color RV Signals for Transmission at the Third Level of the Digital Hierarchy", published in Proceedings of the IEEE, vol. 73, No. 4, Apr. 1985, pp. 765-772.

An article by Hong, entitled "An Efficient Loop/Post Filter to Reduce Annoying Artifacts of H.26L Video Coder", published in 2000 Digest of Technical Papers, International Conference on Consumer Electronics 19th in the Series, pp. 240-241.

An article by Topiwala et al., entitled "Overview and Performance Evaluation of the ITU-T Draft H.26L Video Coding Standard", published in Proceedings of the SPIE, vol. 4472, Jul. 31, 2001, pp. 290-306.

An article by Haskell et al., entitled "Digital Video: an Introduction to MPEG-2", published in Digital Multimedia Standards Series, 1997, pp. 146-205, and 208-257.

"H.26L Test Model Term No. 8 (TML-8) draft0," ITU-Telecommunications Standardization Sector, Study Group 16, Video Coding Experts Group (VCEG), Oct. 7, 2001, VCEG-N10, pp. 1-46.

U.S. Appl. No. 11/928,517 to Xue et al., filed Oct. 30, 2007.
U.S. Appl. No. 11/928,491 to Xue et al., filed Oct. 30, 2007.
U.S. Appl. No. 11/928,468 to Xue et al., filed Oct. 30, 2007.
U.S. Appl. No. 11/928,429 to Xue et al., filed Oct. 30, 2007.
U.S. Appl. No. 11/929,440 to Kadono et al., filed Oct. 30, 2007.
U.S. Appl. No. 11/929,462 to Kadono et al., filed Oct. 30, 2007.

Barzykina et al., "Removal of Blocking Artifacts Using Random Pattern Filtering," ICIP 99, Proceedings of 1999 International Conference on Image Processing, Kobe, Japan, Oct. 24-28, 1999, Piscataway, NJ, USA, IEEE, US, vol. 2, Oct. 24, 1999, pp. 904-908, XP010369045.

Vetro et al., "Minimum Drift Architectures for 3-Layer Scalable DTV Decoding," 19980801, vol. 44, No. 3, Aug. 1, 1998, pp. 527-536, XP011083640.

Vetro et al., "Frequency Domain Down-Conversion of HDTV Using an Optimal Motion Compensation Scheme," International Journal of Imaging Systems and Technology, Wiley and Sons, New York, U.S., vol. 9, No. 4, Jan. 1, 1998, pp. 274-282, XP000768998.

Gisle Bjontegaard(Ed): "H. 26L Test Model Long-Term No. 8 (TML-8) draft0", Video Standards and Drafts, ITU Q.6/SG16, VCEG, No. VCEG-N10, Sep. 20, 2001, pp. 1-46, XP002518166.

Lee Y. L. et al., "Loop-filtering and post-filtering for low bit-rates moving picture coding ", 1999 International Conference on Image Processing, IEEE, Oct. 24, 1999, pp. 94-98.

Min-Cheol Hong, "An efficient loop/post filter to reduce annoying artifacts of H.26L video coder", 2000 Digest of Technical Papers, International Conference on Consumer Electronics, Nineteenth in the Series (Cat. No. 00CH37102), IEEE, Jun. 13, 2000, pp. 240-241.

Haskell B.G. et al., "Digital Video: an introduction to MPEG-2 ", 1997, pp. 146-257.

European Search Report dated Nov. 3, 2011.
European Search Report dated Nov. 8, 2011.
Japanese Office Action, dated Apr. 9, 2013, in related Japanese Patent Application.

"Summons to attend oral proceedings pursuant to Rule 115(1) EPC", dated Sep. 23, 2014, from the European Patent Office in related European Patent Application No. 10178497.3.

"Summons to attend oral proceedings pursuant to Rule 115(1) EPC", dated Sep. 23, 2014, from the European Patent Office in related European Patent Application No. 10178488.2.

Official Action from the U.S. Patent and Trademark Office, dated Oct. 24, 2014, in related U.S. Appl. No. 11/929,462.

European Patent Office (EPO) Office Action, dated Dec. 1, 2017, in European Patent Application No. 15163853.3-1908.

Peter List et al., "Report of the Ad Hoc Committee on H.26L Loop Filter Complexity Reduction", 14. VCEG Meeting: Sep. 24-27, 2001; Santa Barbara, California; (Video Coding Experts Group of ITU-T SG.16), No. VCEG-N008, Sep. 4, 2001, XP030003261.

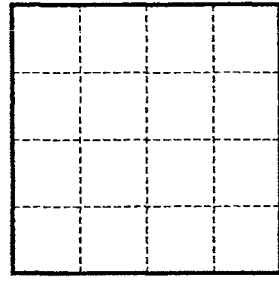
Fig.3(g)
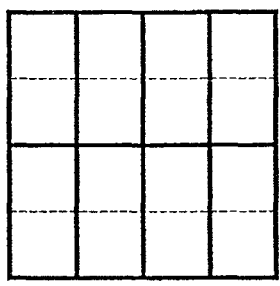
Fig.3(c)
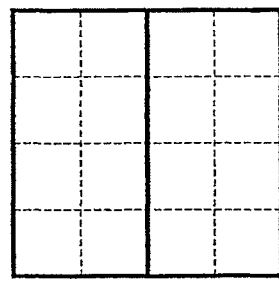
Fig.3(f)
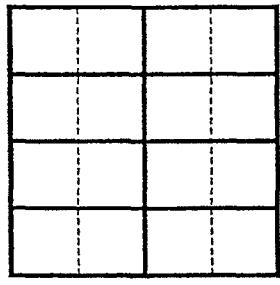
Fig.3(b)
Fig.3(e)
Fig.3(a)
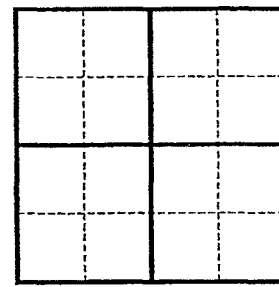
Fig.3(d)

Fig.5

| QP | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|----|---|---|---|---|---|---|---|---|---|---|----|----|----|----|----|----|----|----|----|----|----|----|----|----|----|----|----|----|----|----|----|----|
| π  | 0 | 0 | 0 | 0 | 0 | 0 | 0 | 0 | 3 | 4 | 4  | 5  | 6  | 7  | 8  | 9  | 13 | 15 | 17 | 17 | 20 | 22 | 25 | 27 | 29 | 30 | 33 | 34 | 36 | 45 | 50 | 50 |
| Ω  | 0 | 0 | 0 | 0 | 0 | 0 | 0 | 0 | 0 | 1 | 2  | 3  | 4  | 5  | 6  | 9  | 10 | 11 | 13 | 14 | 16 | 18 | 20 | 22 | 24 | 24 | 29 | 29 | 34 | 36 | 35 | 35 |
| φ  | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 1  | 1  | 2  | 2  | 2  | 2  |

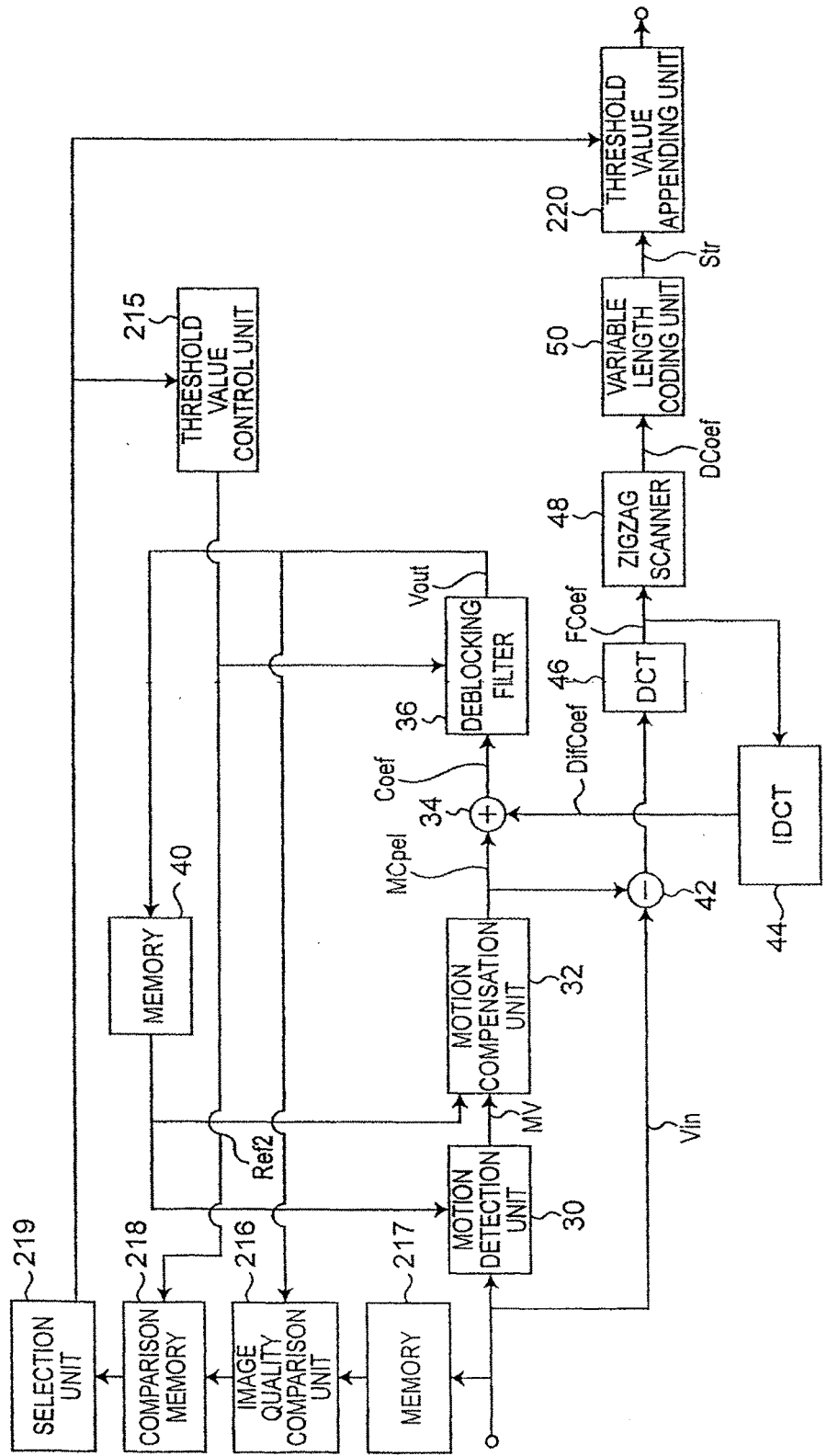

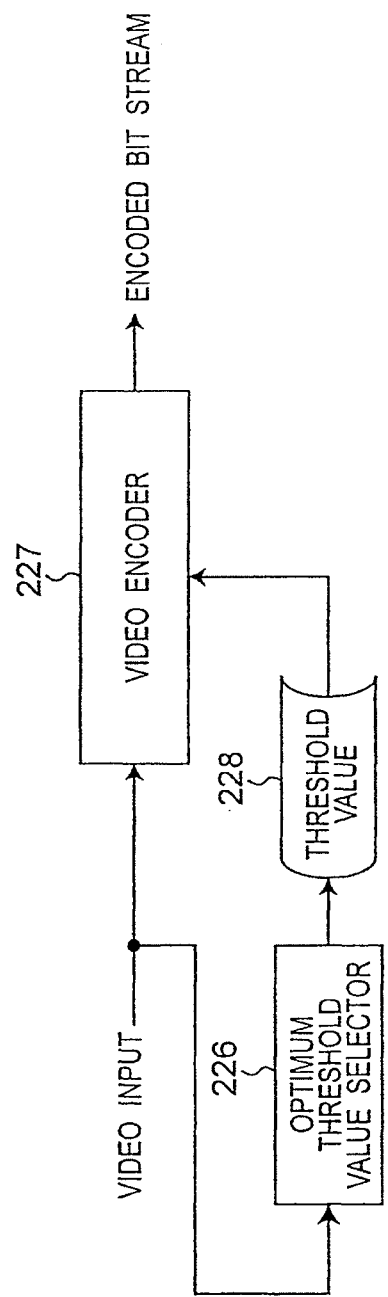

Fig.18

| A | B | E | F | | | | |
|---|---|---|---|---|---|---|---|
| C | D | G | H | | | | |
| I | J | M | N | | | | |
| K | L | O | P | | | | |
| | | | | | | | |
| | | | | | | | |
| | | | | | | | |
| | | | | | | | |

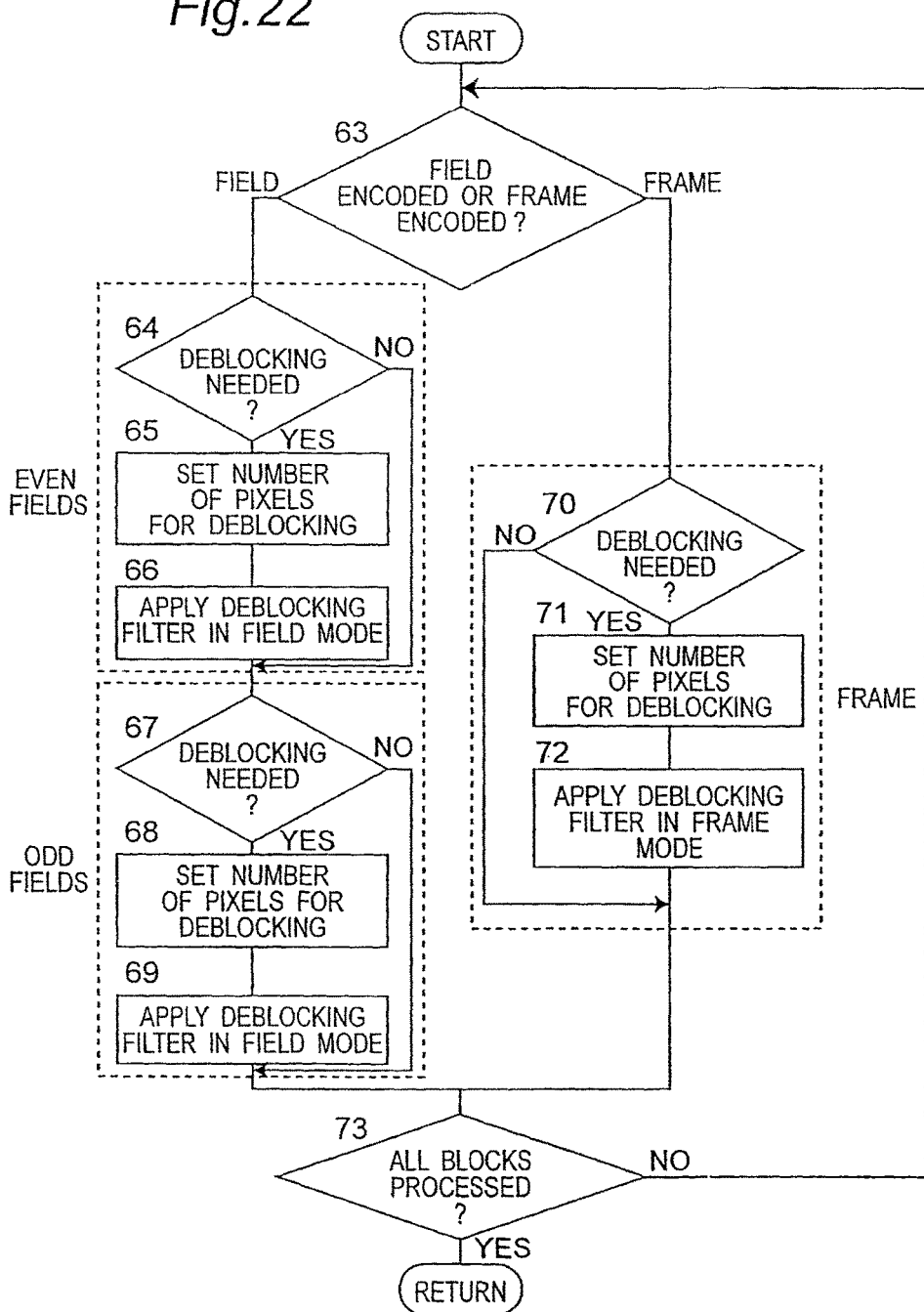

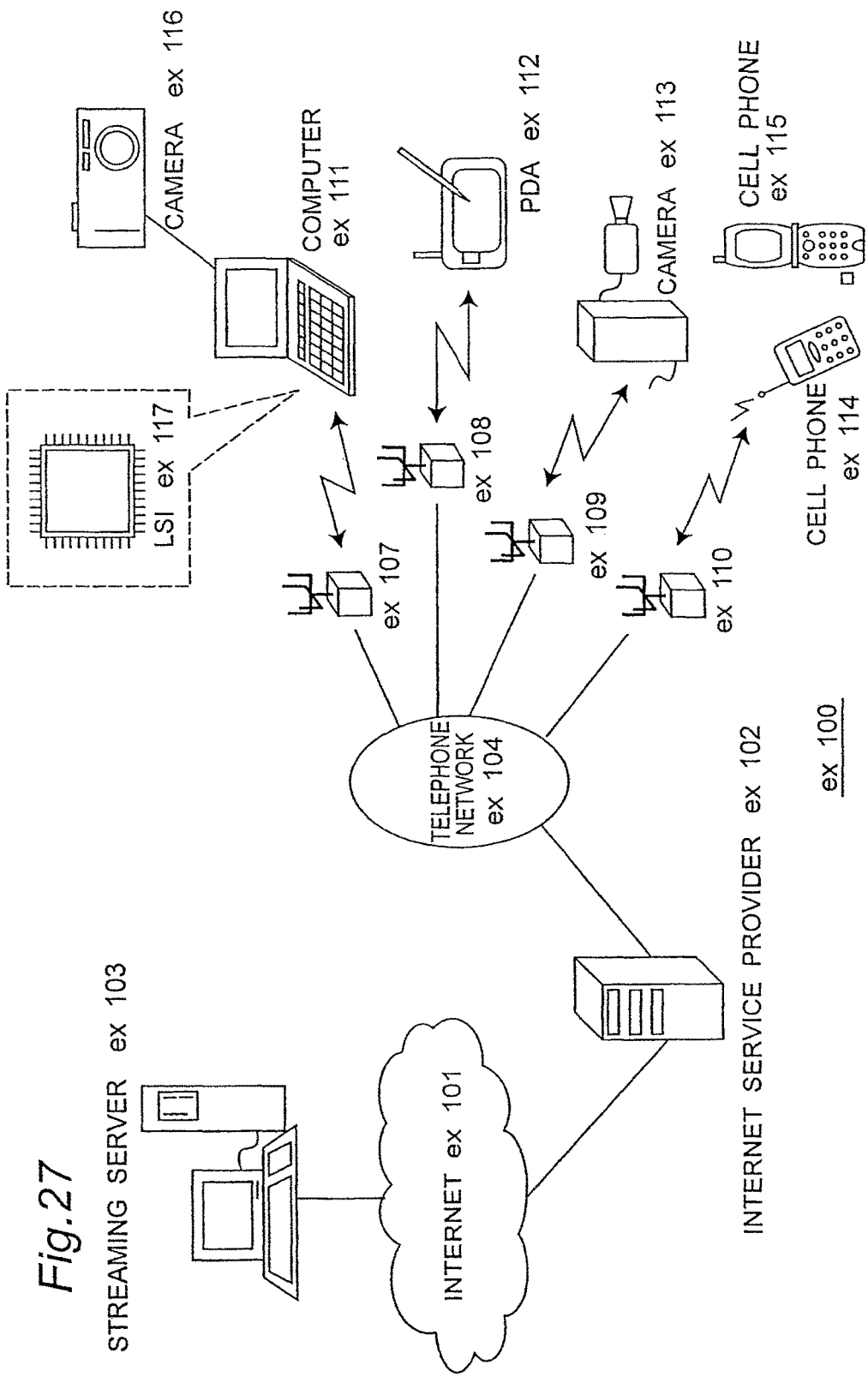

Conventional Art
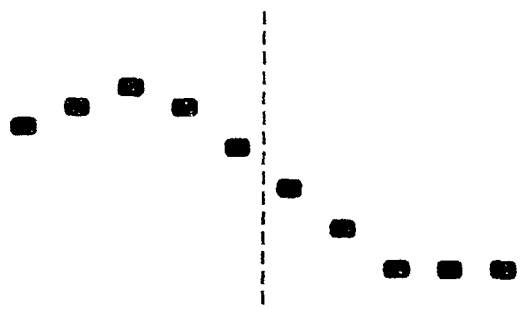
Fig.31(a)  SOURCE IMAGE
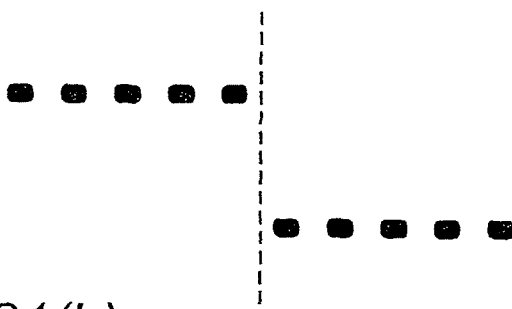
Fig.31(b)  BEFORE FILTERING
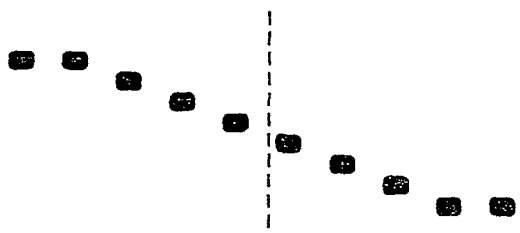
Fig.31(c)  AFTER FILTERING

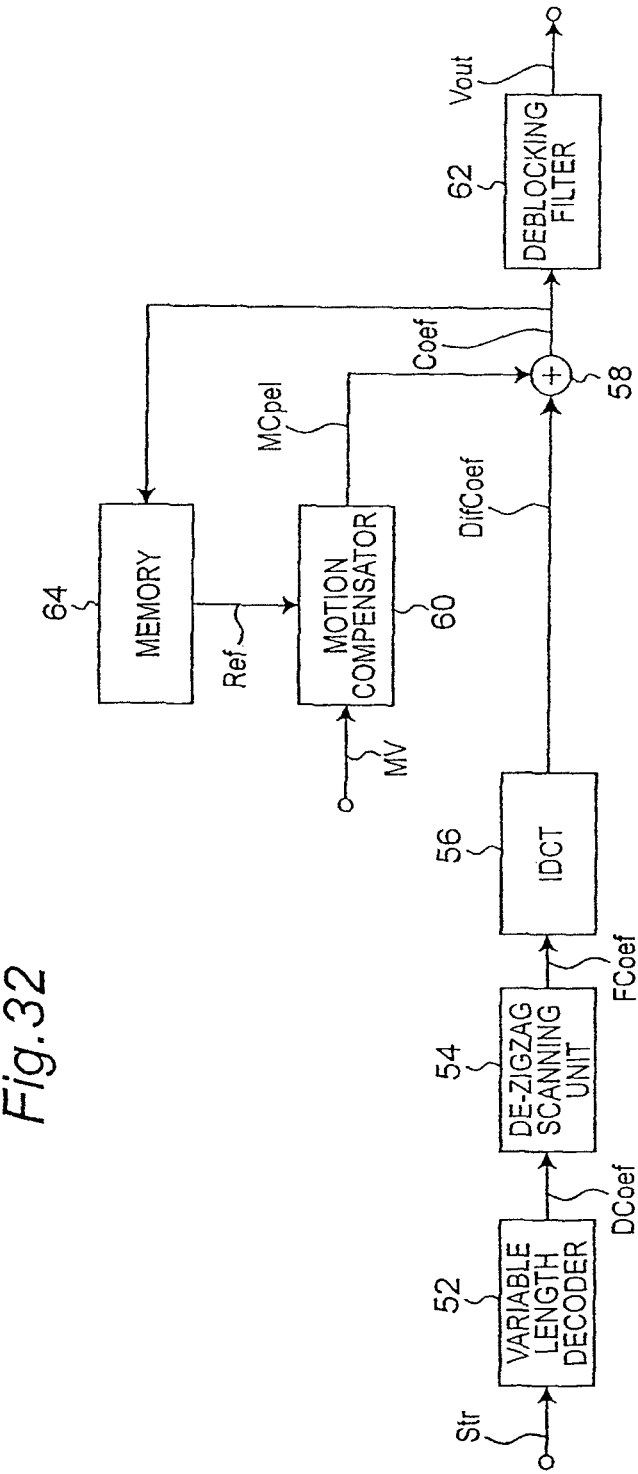

PICTURE DECODING METHOD FOR DECODING CODED PICTURE DATA AND PERFORMING DISTORTION REMOVAL BY COMPARING PIXEL DIFFERENCE VALUES WITH THRESHOLD

CROSS-REFERENCE TO RELATED APPLICATION

This application is a continuation of U.S. patent application Ser. No. 11/929,416, filed Oct. 30, 2007, which is a continuation of U.S. patent application Ser. No. 11/433,464, filed May 15, 2006, which is now abandoned, which is a continuation of U.S. patent application Ser. No. 10/451,628, filed Jul. 8, 2003, which issued as U.S. Pat. No. 7,095,787 on Aug. 22, 2006, which is a U.S. National Stage application of PCT application PCT/JP02/12488, filed on Nov. 29, 2002, and claims the benefit of U.S. Provisional Application No. 60/333,763, filed Nov. 29, 2001, U.S. Provisional Application No. 60/333,767, filed Nov. 29, 2001, and U.S. Provisional Application No. 60/394,312, filed Jul. 9, 2002, as well as Japanese Application Nos. 2002-008859, filed Jan. 17, 2002, 2002-110748, filed Apr. 12, 2002, 2002-127101, filed Apr. 26, 2002, and 2002-291264, filed Oct. 3, 2002, the disclosures of which are expressly incorporated herein by reference in their entireties.

The present invention relates to a coding distortion removal method for removing coding distortion that occurs when encoding a video signal, an encoding method and a decoding method for increasing the compression rate using this coding distortion removal method, and a data recording medium storing a program for implementing these methods in software.

BACKGROUND ART

Through advances in digital technologies combining multiple audio, video, and other kinds of pixel streams into a single transmission stream, conventional information media, that is, means of communicating information to people such as newspapers, magazines, television, radio, and the telephone, can now be used for multimedia communication. "Multimedia" generally refers to text, graphics, audio, and video linked together in a single transmission stream, but conventional information media must first be digitized before the information can be handled in a multimedia format.

The estimated storage capacity needed to store the information carried by conventional information media when converted to digital data is only 1 or 2 bytes per character for text, but 64 kbits for one second of telephone quality audio, and 100 Mbits for one second of video at current television receiver quality. It is therefore not practical to handle these massive amounts of
video, and other kinds of pixel streams into a single transmission stream, conventional information media, that is, means of communicating information to people such as newspapers, magazines, television, radio, and the telephone, can now be used for multimedia communication. "Multimedia" generally refers to text, graphics, audio, and video linked together in a single transmission stream, but conventional information media must first be digitized before the information can be handled in a multimedia format.

The estimated storage capacity needed to store the information carried by conventional information media when converted to digital data is only 1 or 2 bytes per character for text, but 64 kbits for one second of telephone quality audio, and 100 Mbits for one second of video at current television receiver quality. It is therefore not practical to handle these massive amounts of information in digital form on the above information media. For example, video telephony service is available over ISDN (Integrated Services Digital Network) lines with a transmission speed of 64 Kbps to 1.5 Mbps, but television camera grade video cannot be sent as is over ISDN lines.

Data compression therefore becomes essential. Video telephony service, for example, is implemented by using video compression techniques internationally standardized in ITU-T (International Telecommunication Union, Telecommunication Standardization Sector) Recommendations H.261 and H.263. Using the data compression methods defined in MPEG-1, video information can be recorded with audio on a conventional audio CD (Compact Disc).

The MPEG (Moving Picture Experts Group) is an international standard for digitally compressing moving picture signals (video). MPEG-1 enables compressing a video signal to 1.5 Mbps, that is, compressing the information in a television signal approximately 100:1. Furthermore, because the transmission speed for MPEG-1 video is limited to approximately 1.5 Mbps, MPEG-2, which was standardized to meet the demand for even higher picture quality, enables compressing a moving picture signal to 2 Mbps to 15 Mbps.

MPEG-4 with an even higher compression rate has also been standardized by the working group (ISO/IEC JTC1/SC29/WG11) that has advanced the standardization of MPEG-1 and MPEG-2. MPEG-4 not only enables low bit rate, high efficiency coding, it also introduces a powerful error resistance technology capable of reducing subjective image degradation even when transmission path errors occur. The ITU-T is also working on standardizing Recommendation H.26L as a next-generation picture coding method.

Unlike conventional video coding techniques, H.26L uses a coding distortion removal method accompanied by complex processing to remove coding distortion. Block unit coding methods using orthogonal transforms such as the DCT techniques widely used in video coding are known to be subject to a grid-like distortion known as block distortion at the coding block boundaries. Because image quality loss in low frequency components is more conspicuous than image quality loss in high frequency components, the low frequency components are coded more faithfully than the high frequency components in block unit coding. Furthermore, because natural images captured with a camera, for example, contain more low frequency components than high frequency components, the coding blocks contain more low frequency components than high frequency components. The coding blocks therefore tend to have substantially no high frequency components and adjacent pixels in a block tend to have substantially the same pixel value.

Furthermore, because coding is by block unit, there is no assurance that the pixel values will be substantially the same at the boundary between adjacent blocks, that is, that the pixel values will change continuously across the block boundary, even if the pixel values are substantially identical within each block. The result is that, as shown in FIG. 31 describing the concept of coding distortion removal, while the change in pixel values is smooth and continuous in the source image across the block boundary indicated by the dotted line as shown in FIG. 31 (a), and the pixel values change continuously within each block as shown in FIG. 31 (b) after the source image is coded by block unit, block distortion, that is, a discontinuity in pixel values only at the block boundary, occurs. Block distortion is thus a significant image quality problem resulting from image coding, but can be reduced by correcting the pixel values to be continuous across the block boundary as shown in FIG. 31 (c). This process of reducing block distortion is called coding distortion removal (also referred to as "deblocking").

When deblocking is applied at the video decoding stage, the deblocking filter can be used as a post filter as shown in the block diagram of a video decoder using a conventional decoding method in FIG. 32, or it can be used as an in-loop filter as shown in the block diagram of a video decoder using a conventional decoding method in FIG. 33. The configurations shown in these block diagrams are described below.

In the block diagram of a video decoder using a conventional decoding method shown in FIG. 32, a variable length decoder 52 variable length decodes encoded signal Str and outputs frequency code component DCoef. A de-zigzag scanning unit 54 rearranges the frequency components of the frequency code component DCoef in two-dimensional blocks, and outputs frequency component FCoef, the block unit frequency components. The reverse cosine transform unit 56 applies dequantization and reverse DCT operations to frequency component FCoef, and outputs difference image DifCoef.

Motion compensator 60 outputs the pixel at the position indicated by externally input motion vector MV from the reference image Ref accumulated in memory 64 as motion compensated image MCpel. Adder 58 adds difference image DifCoef and motion compensated image MCpel to output reconstructed image Coef. Deblocking filter 62 applies coding distortion removal to reconstructed image Coef, and outputs decoded image signal Vout. Reconstructed image Coef is stored in memory 64, and used as reference image Ref for the next image decoding.

The block diagram in FIG. 33 of a video decoder using a conventional decoding method is substantially identical to the block diagram of a video decoder shown in FIG. 32, but differs in the location of the deblocking filter 62. As will be known from FIG. 33 the decoded image signal Vout output from deblocking filter 62 is stored to memory 64.

The block diagram in FIG. 32 of a video decoder using a conventional decoding method shows the configuration and method used in MPEG-1, MPEG-2, MPEG-4, and H.263. The block diagram in FIG. 33 of a video decoder using a conventional decoding method shows the configuration and method used in H.261 and H.26L TM8.

With the block diagram in FIG. 32 of a video decoder using a conventional decoding method the reconstructed image Coef stored to memory 64 is not dependent upon the method applied by the deblocking filter 62. This allows developing and implementing various kinds of deblocking filters 62, including complex yet high performance filters as well as simple filters with relatively little effect according to the performance of the available hardware and the specific application. The advantage is that a deblocking filter 62 appropriate to the device can be used.

With the block diagram in FIG. 33 of a video decoder using a conventional decoding method the decoded image signal Vout stored to memory 64 is dependent upon the method employed by the deblocking filter 62. The problem here is that the filter cannot be changed to one appropriate to the hardware or application, but the advantage is that the same level of coding distortion removal can be assured in every device.

FIG. 34 is a block diagram of a coding distortion removal unit using the conventional coding distortion removal method. FIG. 34 shows the configuration of the deblocking filter 62 in FIG. 32 and FIG. 33 in detail. To efficiently remove only coding distortion from an image signal containing coding distortion, it is important to determine the amount and tendency for coding distortion in the image signal and then apply appropriate filtering so as to not degrade the actual image signal.

Because high frequency components account for much of the coding distortion, the general concept behind coding distortion removal is to survey the image signal to determine the ratio of high frequency components in the image signal, identify high frequency components in image signal pixels normally thought to not contain a high frequency component as coding distortion, and apply a high frequency component suppression filter to the coding distortion. This is possible because the correlation between adjacent pixels in an image signal is high, pixels containing a high frequency component are concentrated in edge areas, and dispersed high frequency components can be considered to be coding distortion.

This deblocking filter 62 was created by the inventors of the present invention based on content found in ITU-T Recommendation H.26L TML8.

Filtered pixel count controller 84 uses reconstructed image Coef to determine the pixel positions containing coding distortion, and outputs filtered pixel count FtrPel. Filter coefficient controller 86 uses filtered pixel count FtrPel and reconstructed image Coef to determine the filter coefficient (including the number of filter taps) appropriate to removing coding distortion from the indicated pixels, and outputs filter coefficient FtrTap. The filter processor 88 applies filtering to remove coding distortion from reconstructed image Coef using the filter coefficient indicated by filter coefficient FtrTap, and outputs decoded image signal Vout.

DISCLOSURE OF INVENTION

The conventional coding distortion removal methods described above are particularly effective at removing coding distortion, but the process is extremely complex and implementation difficult.

A further problem is that the amount of data processed per unit time is high.

Furthermore, no matter how effective the coding distortion removal method, it is impossible to accurately distinguish image signals and coding distortion without other additional information, and there is, therefore, the possibility that coding distortion removal will degrade image quality. This problem is particularly great with a configuration as shown in the block diagram in FIG. 33 of a video decoder using a conventional decoding method because the result of deblocking is used as the reference image and therefore affects the result of coding each subsequent picture.

An object of the present invention is therefore to provide a simple coding distortion removal method.

A further object is to provide a coding distortion removal method, a coding method, and a decoding method whereby the likelihood of degrading image signal quality can be reduced by applying high performance coding distortion removal with less possibility of degrading image signal quality as a result of removing coding distortion than the prior art.

To achieve this object, a coding distortion removal method according to the present invention for removing coding distortion from a picture uses different methods to remove coding distortion at boundaries where the motion compensation unit boundary matches the coding unit boundary match, and boundary depending on whether the boundary is a motion compensation block boundary or not, when the motion compensation block size is larger than the coding block size.

Because coding distortion at the boundary of the motion compensation unit differs qualitatively from coding distortion at the coding unit boundary, coding distortion can be efficiently removed from an image signal containing coding distortion by changing the filter used for deblocking according to the unit.

Furthermore, when coded motion compensation error is 0, coding distortion is preferably removed only at the motion compensation block boundary.

A further aspect of the invention is a coding distortion removal method for removing coding distortion from a picture by means of a step for extracting picture parameters from a picture containing coding distortion; a first step for identifying pixels for coding distortion removal using the picture parameters; a second step for identifying the method for coding distortion removal using the picture parameters; and a third step for removing coding distortion from the pixels identified by the first step using the coding distortion removal method identified by the second step.

By first computing picture parameters that can be used in both the first step identifying the pixels from which coding distortion is removed and the second step identifying the method used to remove the coding distortion, the operations performed in the first step and second step can be simplified by using these common picture parameters, and processing by the coding distortion removal method can be reduced without degrading image quality.

A further aspect of the invention is a coding distortion removal method for removing coding distortion from a picture whereby the pixels to be processed for coding distortion removal are identified by block based determination whether to remove coding distortion by block unit, and then pixel based determination whether to remove coding distortion for each pixel in the blocks determined to be removed by the block based determination.

By thus first determining by block unit whether coding distortion removal is needed, evaluation by pixel unit can be omitted in those blocks that do not need deblocking, and the processing performed by the coding distortion removal method can be reduced. Blocks that do not need deblocking (such as still image blocks where the pixels perfectly match the reference image) can be easily determined if the image coding information is used.

A yet further aspect of the invention is a coding distortion removal method for removing coding distortion in an area disposed on both sides of a block boundary between a first block and an adjacent second block in a picture having a plurality of blocks forming a moving picture image. This method has a comparison step for comparing a difference of pixel values of the first block and pixel values in pixels of the second block, and a parameter, corresponding to the average of a quantization parameter for the first block and a quantization parameter for the second block, for determining the method for removing coding distortion; and a removal step for removing coding distortion based on the result from the comparison step.

This enables the average of the quantization parameters for the adjacent blocks to be used when filtering both sides of the block boundary in a coding distortion removal process at the block boundary between different quantization parameters.

Another coding distortion removal method for removing coding distortion in an area disposed on both sides of a boundary line between a first block and an adjacent second block in a picture having a plurality of blocks forming a moving picture image has a decoding step for decoding a parameter for setting a threshold value when removing coding distortion; a comparison step for comparing a difference of pixel values in pixels of the first black and pixel values in pixels of the second block, and a specific threshold value based on the decoded parameter; and a removal step for switching the method for removing coding distortion based on the result from the comparison step.

Coding distortion can thus be efficiently removed from an image signal containing coding distortion by first superposing to each encoded signal a threshold value parameter used for coding distortion removal, and then prior to coding distortion removal detecting the threshold value appropriate to each encoded signal and using it to remove coding distortion.

Further preferably, the moving picture contains a slice composed of plural blocks; and the parameter is stored in slice header information in a code stream obtained by encoding image-data for the moving picture.

A further aspect of the invention is a moving picture coding apparatus for picture coding with reference to at least one of multiple reference images, wherein a plurality of coded images obtained by removing coding distortion using plural methods are the reference images.

By thus using plural images deblocked by at least two methods as reference images and sequentially selecting the appropriate one for reference, the picture obtained by efficiently removing coding distortion from an image signal containing coding distortion can be used as the reference image, and the compression rate of moving picture coding can be increased.

Further preferably the first method of the plural methods is a method that does not remove coding distortion in the coded picture, and the second method is a method that removes coding distortion in the coded picture.

A further aspect of the invention is a moving picture decoding apparatus for decoding with reference to at least one of multiple reference images, wherein a plurality of decoded images obtained by removing coding distortion using plural methods are the reference images.

By thus using plural images deblocked by at least two methods as reference images and sequentially selecting the appropriate one for reference, the picture obtained by efficiently removing coding distortion from an image signal containing coding distortion can be used as the reference image, and the coded signal can be corrected decoded.

Further preferably, the first method of the plural methods is a method that does not remove coding distortion in the decoded picture, and the second method is a method that removes coding distortion in the decoded picture.

A further aspect of the invention is a coding distortion removal method for removing coding distortion in an interlaced picture composed of odd-line pixels and even-line pixels. This method has an evaluation step for determining if a picture is a picture containing frame structure blocks having a specific number of odd-line pixels and a specific number of even-line pixels, a picture containing blocks of one field structure composed of a specific number of odd-line pixels, or a picture containing blocks of another field structure composed of a specific number of even-line pixels; and a removal step for removing coding distortion between adjacent frame structure blocks when the target block for coding distortion removal is a block in a picture in which all blocks are frame structure blocks, and removing coding distortion between adjacent field structure blocks when the target block for coding distortion removal is a block in a picture in which all blocks are field structure blocks.

Processing of the blocks for coding distortion removal can thus be changed based on whether the blocks are in a picture of frame structure blocks or a picture of field structure blocks.

Preferably, if the target block for coding distortion removal is a block of a picture containing frame structure blocks and field structure blocks, the coding distortion removal method also has a conversion step for converting a field structure block to a frame structure block; a comparison step for comparing a difference of pixel values in pixels of the field structure block and pixel values in pixels of the converted block with a specific threshold value; and a removal step for removing coding distortion based on the result from the comparison step.

In a further coding distortion removal method for removing coding distortion in an area disposed on both sides of a boundary line between a first block and an adjacent second block in a picture having a plurality of blocks forming a moving picture image, the first blocks are frame structure blocks having a specific number of odd-line pixels and a specific number of even-line pixels in an interlaced picture composed of odd-line pixels and even-line pixels, and the second blocks are field structure blocks having one field composed of a specific number of odd-line pixels in an interlaced picture composed of odd-line pixels and even-line pixels, and another field composed of a specific number of even-line pixels in an interlaced picture composed of odd-line pixels and even-line pixels. The coding distortion removal method has a conversion step for converting a frame structure first block to a field structure block; a comparison step for comparing a difference of pixel values in pixels of the field structure second block and pixel values in pixels of the converted block with a specific threshold value; and a removal step for removing coding distortion based on the result from the comparison step.

When field structure blocks and frame structure blocks are adjacent, the target blocks for coding distortion removal can thus be adaptively processed.

Preferably, conversion from frame structure first blocks to field structure blocks switches by macroblock unit or units of two vertically adjacent macroblocks.

Further preferably, field structure second blocks are not converted to frame structure blocks.

In a further coding distortion removal method for removing coding distortion in an area disposed on both sides of a boundary line between a first block and an adjacent second block in a picture having a plurality of blocks forming a moving picture image, the first blocks are frame structure blocks having a specific number of odd-line pixels and a specific number of even-line pixels in an interlaced picture composed of odd-line pixels and even-line pixels, and the second blocks are field structure blocks having one field composed of a specific number of odd-line pixels in an interlaced picture composed of odd-line pixels and even-line pixels, and another field composed of a specific number of even-line pixels in an interlaced picture composed of odd-line pixels and even-line pixels. The coding distortion removal method has an evaluation step for determining if the target block for coding distortion removal is a frame structure block or a field structure block; a conversion step for converting the frame structure first block to a field structure block when the target block is a field structure second block, and converting the field structure second block to a frame structure block when the target block is a frame structure first block; a comparison step for comparing pixel values in pixels of the target block with a specific threshold value; and a removal step for removing coding distortion based on the result from the comparison step.

When field structure blocks and frame structure blocks are adjacent, the target blocks for coding distortion removal can thus be adaptively processed.

Preferably, conversion in the conversion step from a frame structure block to a field structure block produces one field after conversion from odd-line pixels in the frame structure block, and produces the other field after conversion from even-line pixels in the frame structure block; and comparison of the difference and threshold value in the comparison step compares pixel values in pixels in one field of the second block and pixel values in pixels in one field of the first block after conversion, or compares pixel values in pixels of the other field in the second block and pixel values in pixels of the other field in the first block after conversion.

In a further coding distortion removal method for removing coding distortion in an area disposed on both sides of a boundary line between a first block and an adjacent second block in a picture having a plurality of blocks forming a moving picture image, the first blocks are frame structure blocks having a specific number of odd-line pixels and a specific number of even-line pixels in an interlaced picture composed of odd-line pixels and even-line pixels, and the second blocks are field structure blocks having one field composed of a specific number of odd-line pixels in an interlaced picture composed of odd-line pixels and even-line pixels, and another field composed of a specific number of even-line pixels in an interlaced picture composed of odd-line pixels and even-line pixels. The coding distortion removal method has a conversion step for converting a field structure second block to a frame structure block; a comparison step for comparing a difference of pixel values in pixels of the frame structure first block and pixel values in pixels of the converted block with a specific threshold value; and a removal step for removing coding distortion based on the result from the comparison step.

When field structure blocks and frame structure blocks are adjacent, the target blocks for coding distortion removal can thus be adaptively processed.

Further preferably, conversion from field structure second blocks to frame structure blocks switches by macroblock unit or units of two vertically adjacent macroblocks.

Yet further preferably, field structure second blocks are not converted to frame structure blocks.

Yet further preferably, conversion in the conversion step from field structure block to frame structure block produces a converted frame from pixels in a block of one field and pixels in a block of the other field, and compares pixel values in odd-line pixels in the first block with pixel values in odd-line pixels in the second block after conversion, or compares pixel values in even-line pixels in the first block with pixel values in even-line pixels in the second block after conversion.

Yet further preferably, the comparison step compares the difference and threshold value by groups of plural pixels aligned in line in a same direction as the boundary line at positions symmetrical to the boundary line.

This enables coding distortion to be removed in groups of plural pixels.

A yet further aspect of the present invention is a picture coding apparatus having a decoding unit for decoding a coded difference picture and outputting the difference picture; a motion compensation unit for outputting a motion compensated picture from a reference image; an adder for adding the difference picture and motion compensated picture, and outputting the merged picture; a coding distortion removal unit for removing coding distortion in the merged picture and outputting a reconstructed picture; and memory for storing the reconstructed picture as the reference image. The coding distortion removal unit removes coding distortion by means of any of the above-described methods of the invention.

A yet further aspect of the invention is a program for removing coding distortion from a picture by means of any of the above-described methods of the invention.

A yet further aspect of the invention is a program for picture coding using a decoding unit for decoding a coded difference picture and outputting the difference picture; a motion compensation unit for outputting a motion compensated picture from a reference image; an adder for adding the difference picture and motion compensated picture, and outputting the merged picture; a coding distortion removal unit for removing coding distortion in the merged picture and outputting a reconstructed picture; and memory for storing the reconstructed picture as the reference image. The coding distortion removal unit removes coding distortion by means of any of the above-described methods of the invention.

Other objects and attainments together with a fuller understanding of the invention will become apparent and appreciated by referring to the following description and claims taken in conjunction with the accompanying drawings.

BRIEF DESCRIPTION OF DRAWINGS

FIGS. 3(a), 3(b), 3(c), 3(d), 3(e), 3(f) and 3(g) show an example of the motion compensation block size;

FIG. 5 shows the correlation between quantization parameter QP and the coding distortion removal parameters in a second embodiment of the present invention;

FIG. 13 is a block diagram showing a video encoding process using a loop filter;

FIG. 14 is a block diagram showing the location of the automatic threshold value selection in a video encoding loop;

FIG. 18 shows the neighborhood of blocks having common boundaries for which deblocking can be skipped;

FIG. 22 is a flow chart of a coding distortion removal process used when frame and field structures are mixed;

FIG. 27 is a block diagram showing the overall configuration of a content supply system;

FIGS. 31(a), 31(b) and 31(c) show pixel signal level diagrams to describe the concept of a coding distortion removal method;

FIG. 32 is a block diagram of a video decoding apparatus using a decoding method of the prior art;

BEST MODE FOR CARRYING OUT THE INVENTION

Figure 1:
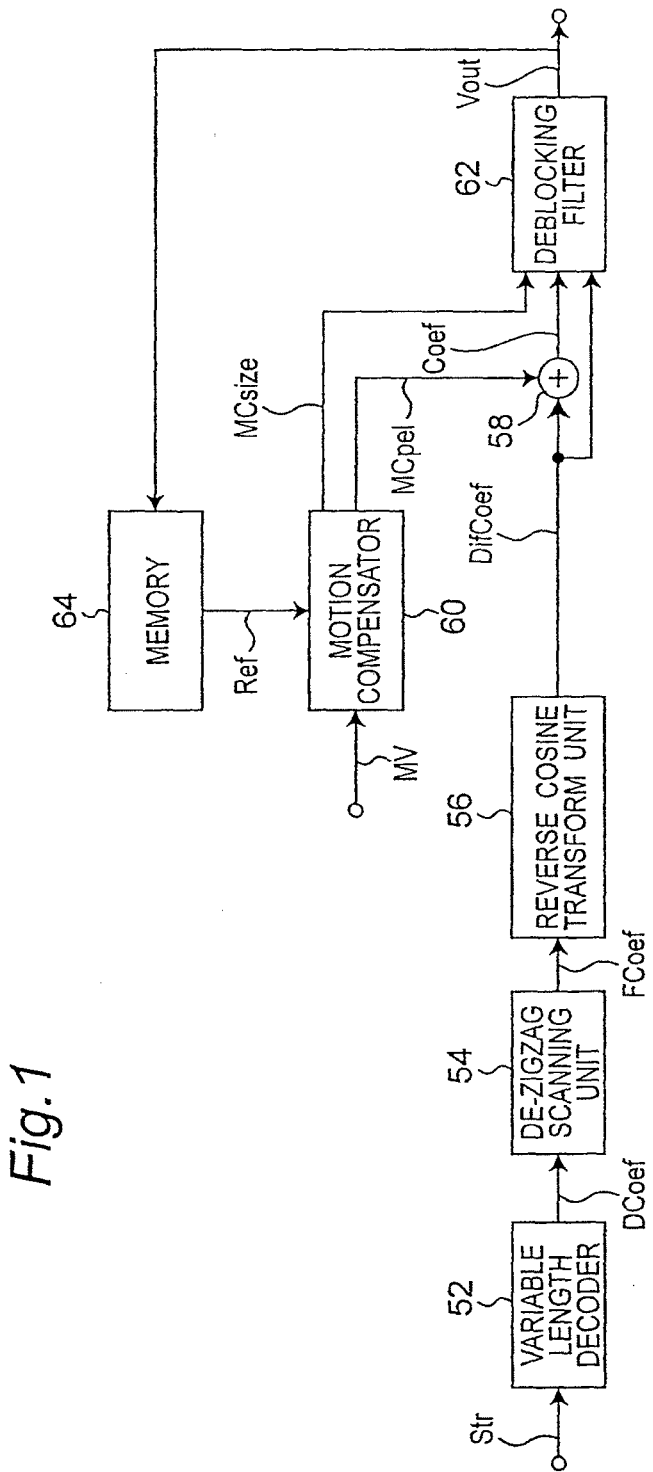
FIG. 1 is a block diagram of a video decoding apparatus using a decoding method according to the present invention.

Preferred embodiments of the present invention are described below with reference to the accompanying figures.

Embodiment 1

In the block diagram of a video decoding apparatus using a video decoding method, variable length decoder 52 variable length decodes encoded signal Str and outputs frequency code component DCoef. De-zigzag scanning unit 54 rearranges the frequency components of the frequency code component DCoef in two-dimensional blocks, and outputs frequency component FCoef, the block unit frequency components. The reverse cosine transform unit 56 applies dequantization and reverse DCT operations to frequency component FCoef, and outputs difference image DifCoef.

Motion compensator 60 outputs the pixel at the position indicated by externally input motion vector MV from the reference image Ref accumulated in memory 64 as motion compensated image MCpel, and outputs motion compensation block size MCsize denoting the size of the motion compensation block. Adder 58 adds difference image Dif-Coef and motion compensated image MCpel to output reconstructed image Coef.

Deblocking filter 62 receives reconstructed image Coef, motion compensation block size MCsize, and difference image DifCoef, applies coding distortion removal, and outputs decoded image signal Vout. Reconstructed image Coef is stored in memory 64, and used as reference image Ref for the next image decoding.

Figure 2:
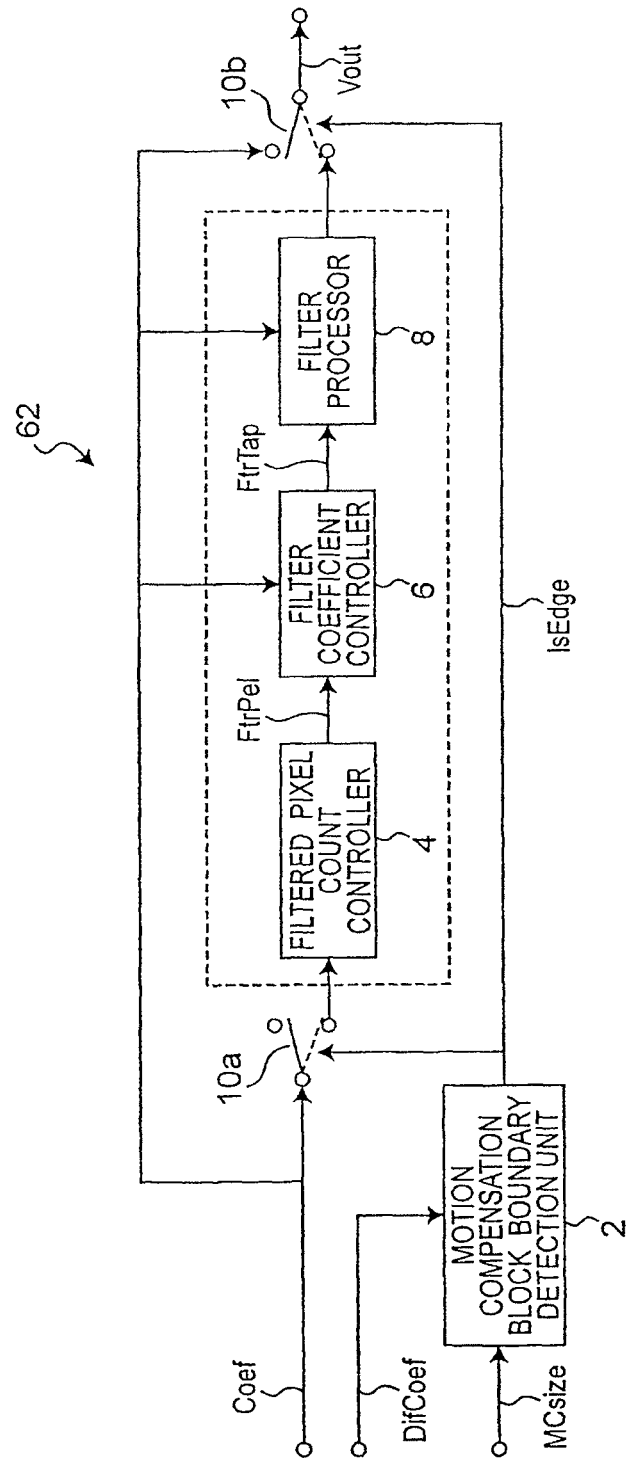
FIG. 2 is a block diagram of a coding distortion removal unit using a coding distortion removal method according to a first embodiment of the present invention.

FIG. 2 is a block diagram of deblocking filter 62 (also called a coding distortion removal unit) using a coding distortion removal method according to the present invention. This deblocking filter 62 was created by the inventors of the present invention with reference to the content of a deblocking filter described in ITU-T Recommendation H.26L TML8.

Filtered pixel count controller 4 determines the pixel positions containing coding distortion for each reconstructed image Coef, and outputs filtered pixel count FtrPel. Filtered pixel count FtrPel thus indicates the pixel position that needs filtering.

Filter coefficient controller 6 uses filtered pixel count FtrPel and reconstructed image Coef to determine the filter coefficient (including the number of filter taps) appropriate to removing coding distortion from the indicated pixels, and outputs filter coefficient FtrTap.

The filter processor 8 applies a filter process to remove coding distortion from reconstructed image Coef using the filter coefficient indicated by filter coefficient FtrTap, and outputs decoded image signal Vout.

The difference image DifCoef and motion compensation block size MCsize are input to motion compensation block boundary detection unit 2, which determines whether the difference image DifCoef for the process block is less than or equal to a specific value, such as whether it is 0, detects the boundaries of the motion compensation block, and outputs motion compensation block boundary flag IsEdge.

FIG. 3 shows examples of the motion compensation block size used in ITU-T Recommendation H.26L TML8. As shown in these examples the maximum motion compensation block size is 16×16 pixels, the same size as what is referred to as a macroblock. The motion compensation block sizes shown in FIG. 3 (*a*) to (*g*) are 4×4, 4×8, 8×4, 8×8, 8×16, 16×8, and 16×16 pixels. In ITU-T Recommendation H.26L TML8 the size appropriate to the macroblock unit is selected from these seven motion compensation block sizes and used for coding and decoding. It should be noted that coding and decoding can be applied to an appropriate unit of two vertically adjacent macroblocks, and a unit of such macroblocks is called a "macroblock pair."

The unit used for frequency transforms and coding in ITU-T Recommendation H.26L TML8 is 4×4 pixels. This unit of 4×4 pixels is called a "coding unit." As shown in FIG. 3 (*a*), each of the sixteen blocks A to P is a 4×4 pixel block. The 4×4 pixel coding unit matches the motion compensation block size only in the case shown in FIG. 3 (*a*). Because block distortion that is particularly visually disruptive as coding distortion occurs at the smallest coding unit size of 4×4 pixels, the conventional coding distortion removal method always works on 4×4 pixel units.

If the correlation between pictures is particularly strong after motion compensation coding, the coded motion compensation error between pictures is 0. Because the difference image DifCoef coded and decoded in 4×4 pixel units is also 0 in this case, discontinuities in the pixel values resulting from coding distortion during coding and decoding likely does not occur in places other than the boundaries of the motion compensation blocks. Therefore, if the motion compensation blocks are selected as shown in FIG. 3 (*b*), the coding distortion removal process is not needed at the 4×4 pixel unit boundaries indicated by the dotted lines between blocks AC, BD, EG, FH, IK, JL, MO, and NP shown in FIG. 3 (*a*). Deblocking is likewise not needed at the 4×4 pixel unit boundaries indicated by the dotted lines between blocks AB, CD, EF, GH, IJ, KL, MN, and OP shown in FIG. 3 (*a*). If difference image DifCoef used for coding/decoding in 4×4 pixel units is also 0, deblocking is applied only at the boundaries of the motion compensation blocks, and is not applied at the boundaries of the 4×4 pixel units within the motion compensation blocks. This makes it possible to reduce the number of operations in the coding distortion removal process compared with deblocking all block boundaries.

If the difference image DifCoef of the process block is 0 and is not the boundary of a motion compensation block, motion compensation block boundary detection unit 2 sets both selectors 10*a* and 10*b* off (indicated by a solid line) and selector 10*b* outputs reconstructed image Coef as decoded image signal Vout. The selectors 10*a* and 10*b* are switched by setting the motion compensation block boundary flag IsEdge. Processing by filtered pixel count controller 4, filter coefficient controller 6, and filter processor 8 can thus be omitted by switching selectors 10*a* and 10*b* off. In cases other than above, selectors 10*a* and 10*b* are ON (denoted by the dotted line), and the output from filter processor 8 is output from selector 10*b* as decoded image signal Vout. This selector state is also set by applying motion compensation block boundary flag IsEdge.

The present invention thus introduces the ability to omit operation of filtered pixel count controller 4, filter coefficient controller 6, and filter processor 8 by applying an appropriately set motion compensation block boundary flag IsEdge, and by skipping these units enables faster processing and reduces power consumption by these processes.

It should be noted that this embodiment is described as simply not applying any coding distortion removal process, a simple coding distortion removal process could be used instead of skipping the process altogether, and switching could be between a complex coding distortion removal process and coding distortion removal processing in 4×4 pixel units.

Embodiment 2

Figure 4:
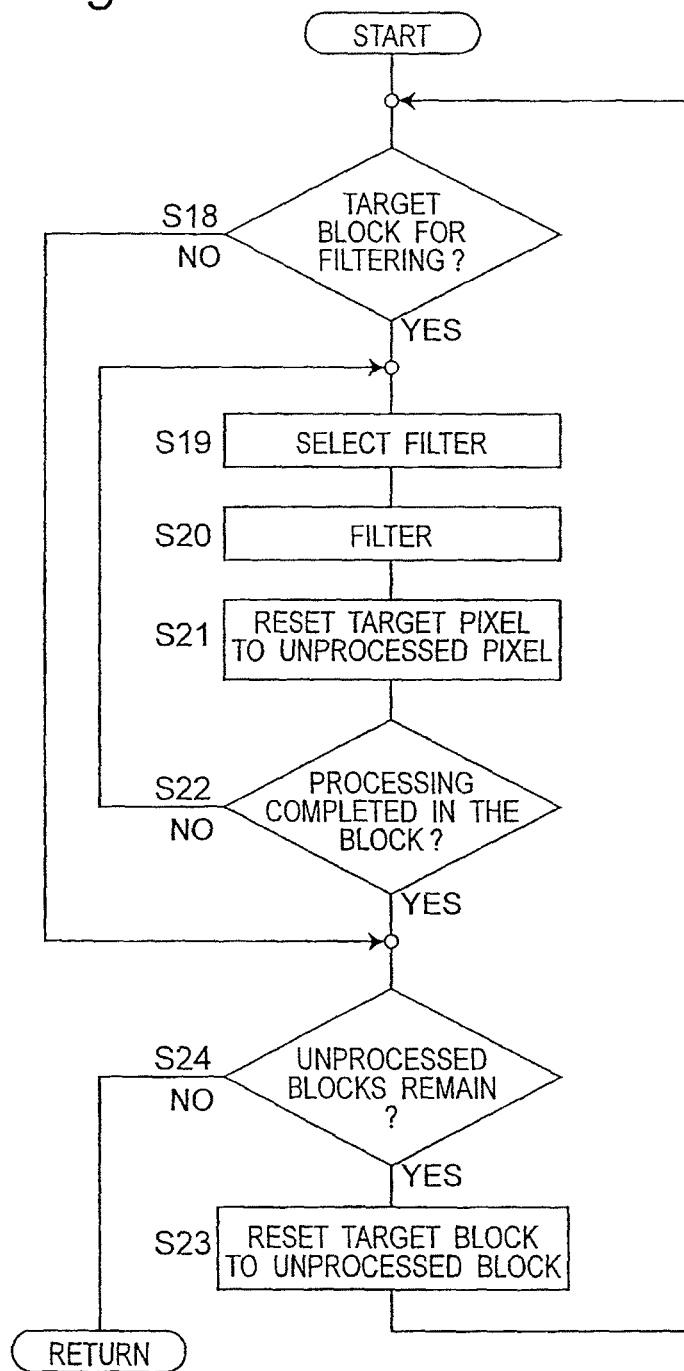
FIG. 4 is a flow chart of a coding distortion removal method according to a second embodiment of the present invention.

A specific process whereby coding distortion removal can be easily achieved is described in this embodiment of the invention with reference to the flow chart in FIG. 4 of a coding distortion removal method according to the present invention.

It is first determined in step S18 whether the target block is a coding distortion removal block. If it is, control advances to step S19. If it is not, control advances to step S24.

An appropriate coding distortion removal filter is selected in step S19, coding distortion removal processing is applied using the selected filter in step S20, and the target pixel is changed to the next unprocessed pixel in the block in step S21. If there are no unprocessed pixels in the block (step S22 returns no), control advances to step S24. If there is an unprocessed pixel (step S22 returns yes), control loops back to step S19 and the process repeats.

Step S24 detects if there is another unprocessed block in the picture. If there is, control advances to step S23. If all blocks have been processed (step S24 returns no), the coding distortion removal process ends for that picture.

If unprocessed blocks remain, the target block is changed to the next unprocessed block in step S23, control loops back to step S18 and the process repeats.

Figure 6:
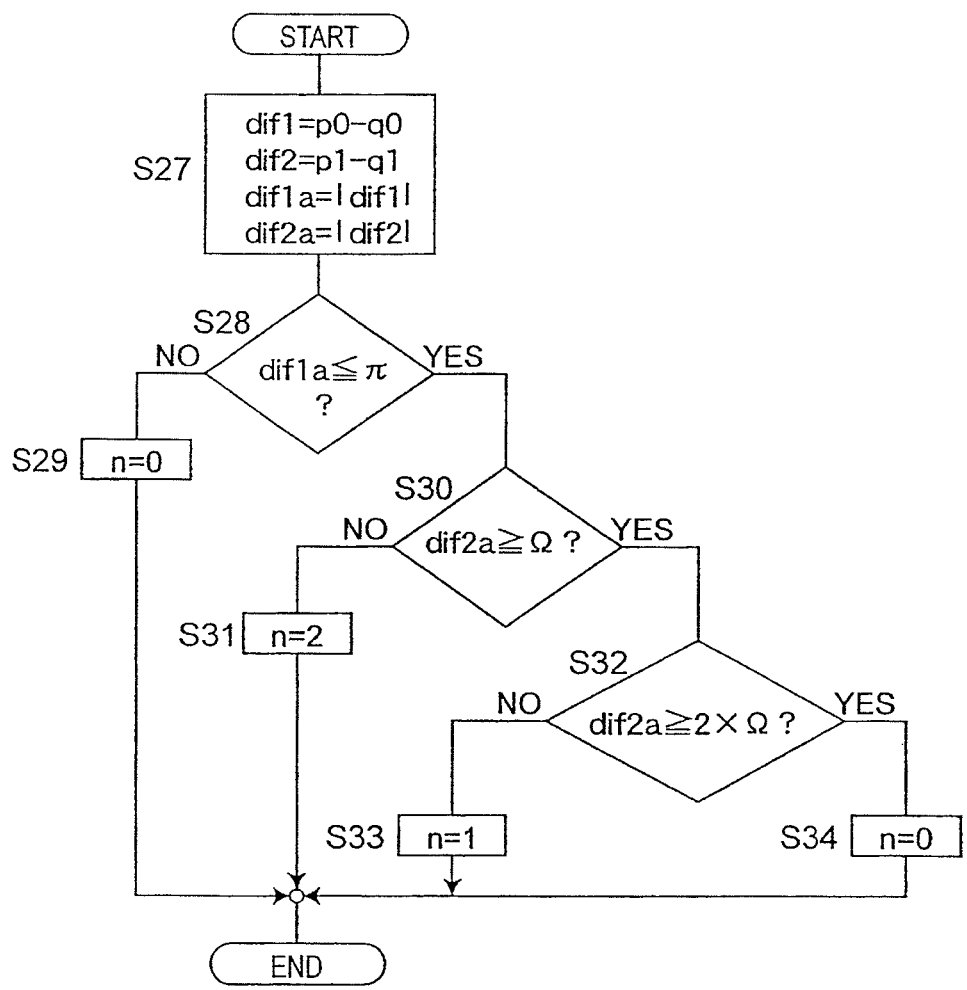
FIG. 6 is a flow chart for determining the number of pixels to filter in a coding distortion removal method according to a second embodiment of the present invention.

FIG. 6 is a flow chart showing how the number of pixels to filter (the "filtered pixel count" below) is determined in the coding distortion removal method of the present invention. This flow chart describes one example how the filtered pixel count controller 4 shown in FIG. 2 could operate. FIG. 6 shows a case in which the motion compensation block is the one shown in FIG. 3(a). As shown in FIG. 8(b), the target pixel values for coding distortion removal are p3, p2, p1, p0, q0, q1, q2, q3 as shown in FIG. 8(b), and the pixel values after coding distortion removal are

P3, P2, P1, P0, Q0, Q1, Q2, Q3.

These pixels values are assigned sequentially in the same order as the pixel positions, p0 to p3 and P0 to P3 to denote corresponding pixels in the same block, and q0 to q3 and Q0 to Q3 denote corresponding pixels in the same block.

As quantization parameter QP increases the quantization steps get larger (coarser) and the size of the coding distortion also increases. It is therefore effective to change the filter according to the size of quantization parameter QP. FIG. 5 is a table showing the correlation between quantization parameter QP and coding distortion removal parameters. The correlation between parameters $\pi$, $\Omega$, and n of the deblocking process for determining parameter n denoting the filtered pixel count is shown in Table 1 below. It should be noted that filtering should not be applied if the pixel difference is large because this denotes an edge, and $\pi$ is therefore preferably set so that filtering is not applied to pixels where the pixel difference is less than $\pi$. Furthermore, if the pixel difference is small the likelihood that the pixels are not at an edge increases as the pixel difference decreases, and $\Omega$ is therefore preferably set so that a stronger filter (i.e., n is high) is applied based on whether the pixel difference is extremely low (less than $\Omega$) or somewhat small (less than $2\times\Omega$).

TABLE 1

| Condition A | Condition B | n |
|---|---|---|
| dif1a > $\pi$ | dif2a < $\Omega$ | 0 |
| dif1a > $\pi$ | $\Omega \le$ dif2a $\le 2\times\Omega$ | 0 |
| dif1a > $\pi$ | dif2a $\ge 2\times\Omega$ | 0 |
| dif1a $\le \pi$ | dif2a < $\Omega$ | 2 |
| dif1a $\le \pi$ | $\Omega \le$ dif2a $\le 2\times\Omega$ | 1 |
| dif1a $\le \pi$ | dif2a $\ge 2\times\Omega$ | 0 |
| where dif1 = p0 - q0 | | |
| | dif2 = p1 - q1 | |
| | dif1a = |dif1| | |
| | dif2a = |dif2|. | |

In other words, the flow chart for determining the filtered pixel count in the coding distortion removal method of the present invention is summarized in Table 1.

Step S27 computes pixel difference DifPel, a parameter that is repeatedly computed in the coding distortion removal process. Note that pixel difference DifPel refers to dif1a and dif2a calculated in step S27.

Step S28 then compares dif1a and $\pi$. If dif1a is greater than $\pi$, step S29 sets n=0 and the process ends without running the coding distortion removal process. If dif1a is less than or equal to $\pi$, control advances to step S30.

In step S30 dif2a is compared with $\Omega$. If dif2a is less than $\Omega$, step S31 sets n=2 (that is, coding distortion removal is applied to the second pixel from the boundary of each adjacent block), and the process ends. If dif2a is greater than or equal to $\Omega$, control advances to step S32.

In step S32 dif2a is compared with $2\times\Omega$. If dif2a is less than $2\times\Omega$, step S33 sets n=1 (that is, coding distortion removal is applied to the first pixel from the boundary of each adjacent block), and the process ends. dif2 is the absolute value of the difference in pixel values in proximity to the boundary, and because the number of high frequency components near the boundary decreases as this difference decreases, coding distortion can be removed efficiently from the boundary area by increasing the number of pixels processed for deblocking as dif2 gets smaller.

Figure 7:
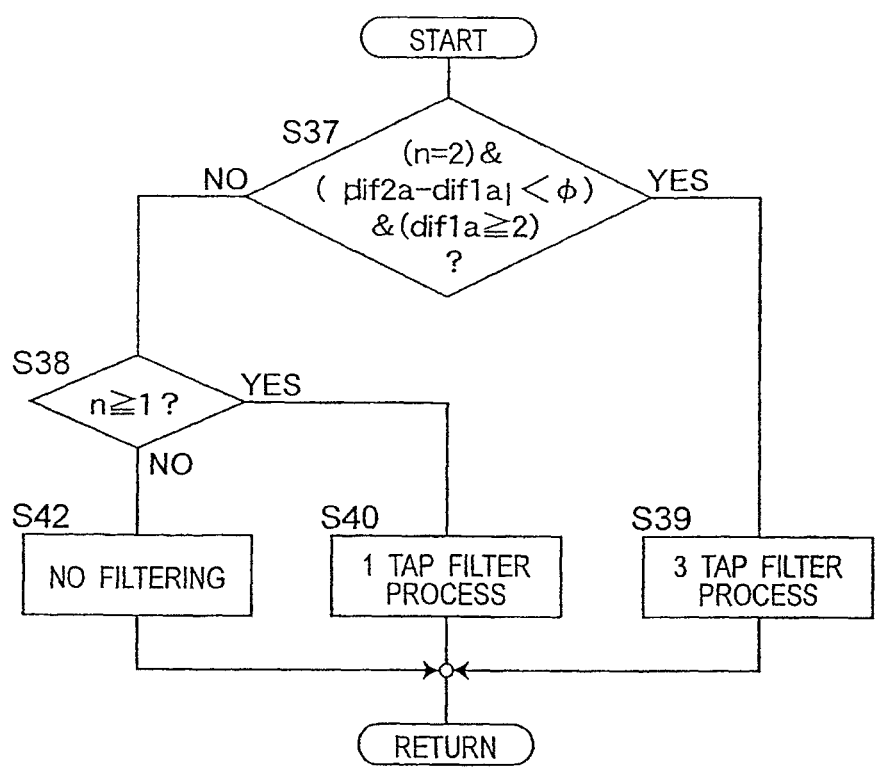
FIG. 7 is a flow chart for determining the filter coefficient in a coding distortion removal method according to a second embodiment of the present invention.

FIG. 7 is a flow chart of a process for determining the filter coefficient in the coding distortion removal method of the present invention, and is an example of the operation of filter coefficient controller 6 in FIG. 2.

Three conditions are compared using n, dif1a, dif2a, and $\phi$ in step S37. If all three conditions are true, a three tap filter process is set in step S39. That is, $\phi$ is the threshold value for determining the number of filter taps, and a three tap filter is applied when the high frequency component is low (n=2) and there is little change in pixel values at the boundary (|dif2a—dif1a|<$\phi$). A three tap filter normally provides stronger suppression of high frequency components than a single tap filter. Because the filter process can be changed using the value of n, parameter n can be used to change the type of filter instead of the number of pixels the filter is applied to. Parameter n thus obtained can also be used to change both the number of pixels filtered and the type of filter applied.

If the three conditions are not true in step S37, the value of n is detected in step S38. If n$\ge$1, step S40 sets a one tap filter process. If n=0, step S42 turns filtering off.

It should be noted that quantization parameter QP can be changed for each block. However, the coding distortion removal process becomes more complicated at the boundary between blocks having a different quantization parameter QP. The present invention prevents this by using:

the average quantization parameter QP of adjacent blocks (fractions may be rounded), the highest quantization parameter QP of the adjacent blocks, the lowest quantization parameter QP of the adjacent blocks, or the quantization parameter QP of the left-adjacent or above-adjacent block as the quantization parameter QP for filtering blocks on both sides of the boundary when the quantization parameter QP changes in the boundary blocks. It should be noted that the difference between using these four quantization parameters QP is little, and one could be preselected for use.

Coding distortion can thus be easily removed by the method described above.

Figure 8A:
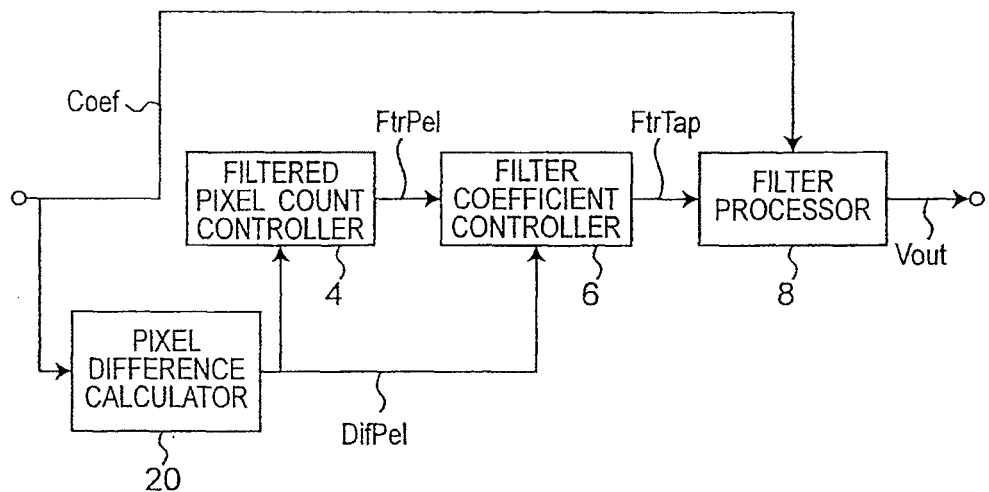
FIGS. 8(a) and 8(b) are a block diagram of a coding distortion removal unit using the coding distortion removal method according to a second embodiment of the present invention, and a diagram showing pixel alignment.
Figure 8B:
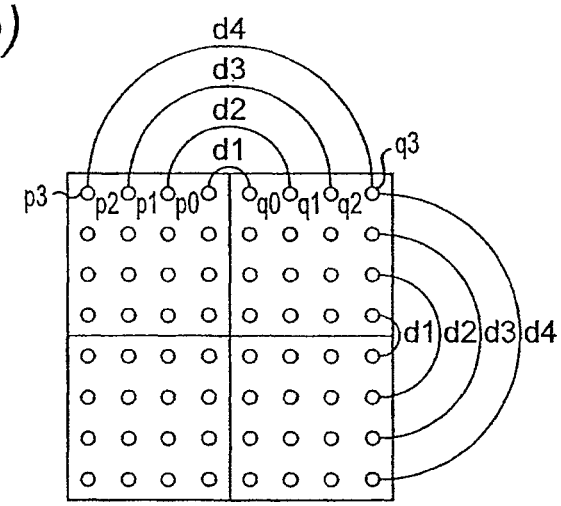
Figure 34:
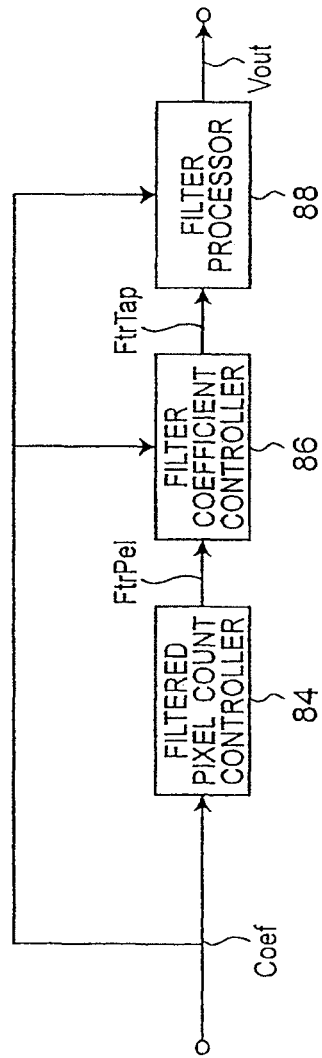
FIG. 34 is a block diagram of a coding distortion removal unit using a coding distortion removal method according to the prior art.

FIG. 8(a) is a block diagram of another embodiment of the deblocking filter 62 shown in FIG. 1, or a separate embodiment of the part enclosed in a dotted line in FIG. 2. It should be noted that like parts in FIG. 8 and the block diagram of the coding distortion removal unit using the conventional coding distortion removal method shown in FIG. 34 are identified by like reference numerals, and further description thereof is omitted.

The pixel difference calculator 20 computes the pixel difference at the block boundary from reconstructed image Coef, and outputs pixel difference DifPel. This pixel difference DifPel contains a signal equivalent to dif1a and dif2a. Pixel difference DifPel is obtained by comparing pixels at symmetrical positions left and right or above and below the boundary between coding unit blocks, and using the difference d1, d2, d3, d4 (color difference or luminance difference) therebetween. If the average of these differences (e.g., (d1+d2+d3+d4)/4) is less than or equal to a specific value, an image boundary line is likely not present in the range of the width used to determine d4, and the deblocking filter is therefore applied. On the other hand, if the average is greater than or equal to a specific value, there is an image boundary and the deblocking filter is not applied. It should be noted that this comparison could use any one, any two, or any three of d1, d2, d3, and d4. Rather than using the average, the highest difference could alternatively be compared with a specific value.

The flow chart for determining the filtered pixel count can be used as an example of filtered pixel count controller 4 operation. An example of filter coefficient controller 6 operation in this embodiment is shown in the flow chart for determining the filter coefficient shown in FIG. 7. By referencing pixel difference DifPel as shown in FIG. 8 (b), the number of pixel difference calculations can be reduced for both filtered pixel count controller 4 and filter coefficient controller 6. The filtered pixel count controller 4 and filter coefficient controller 6 can therefore set the filtered pixel count and filter coefficient without referencing reconstructed image Coef.

It will thus be apparent that the number of computations can be reduced by repeatedly using the value computed as pixel difference DifPel.

Embodiment 3

This embodiment of the invention describes an encoding apparatus and a decoding apparatus implementing the coding distortion removal method described in another embodiment of the invention.

Figure 9:
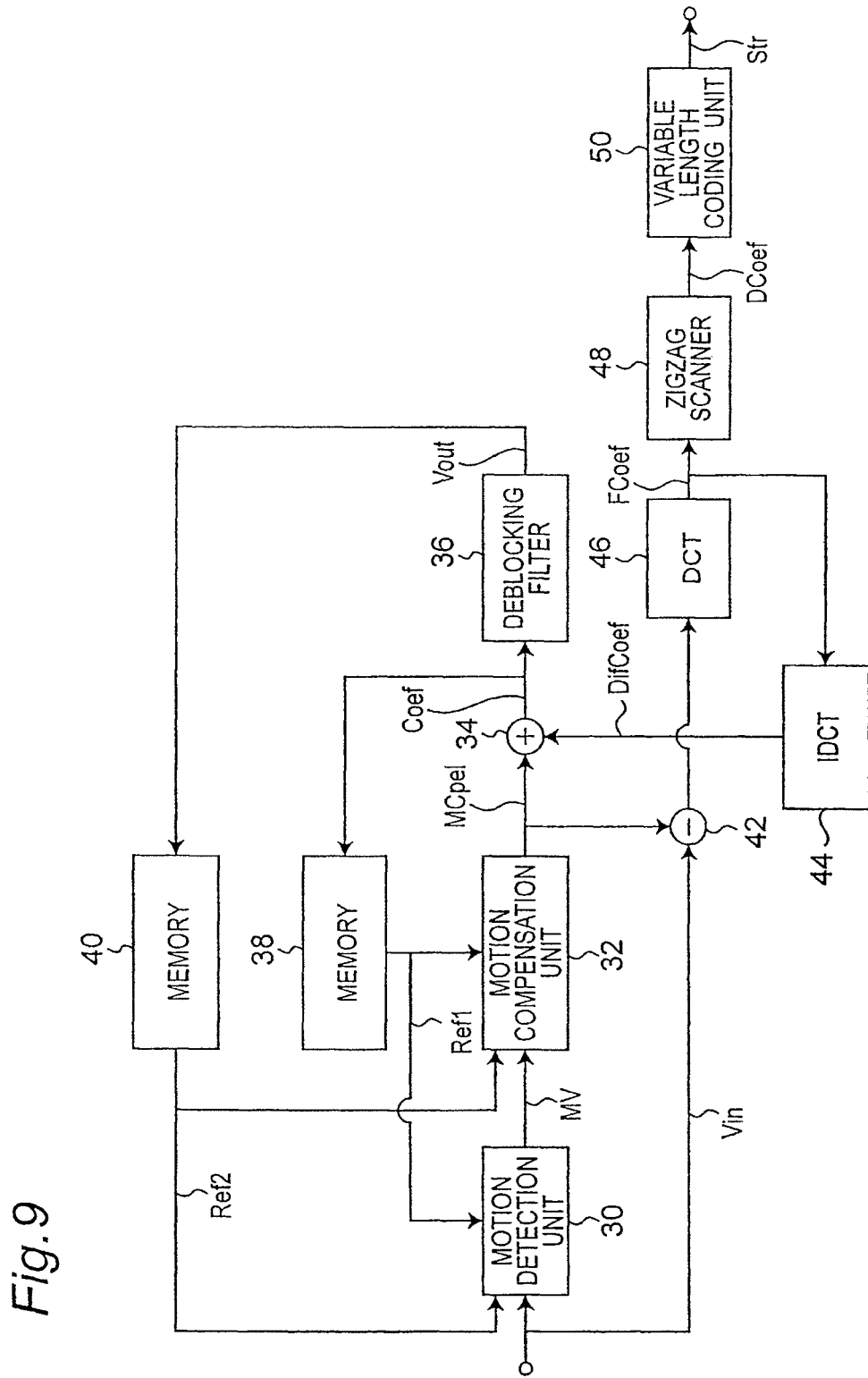
FIG. 9 is a block diagram of a coding device using a coding method according to a third embodiment of the present invention.

FIG. 9 is a block diagram of the encoding apparatus.

Motion detection unit 30 compares reference image Ref1 and reference image Ref2 output respectively from first memory 38 and second memory 40 with image signal Vin, and detects motion vector MV, that is, the amount of motion in image signal Vin relative to the reference image. It should be noted that information indicating whether prediction error will be less by referencing reference image Ref1 or reference image Ref2 is also included in the motion vector MV and reported to motion compensation unit 32. The motion compensation unit 32 extracts the image at the position indicated by motion vector MV from reference image Ref1 or reference image Ref2, and outputs it as motion compensated image MCpel.

Subtracter 42 obtains the difference of image signal Vin and motion compensated image MCpel, and outputs to cosine transform unit (DCT) 46. Cosine transform unit 46 computes the DCT and quantizes the input difference, and outputs frequency component FCoef. Zigzag scanner 48 outputs frequency code component DCoef reordering the sequence of frequency component FCoef, and variable length coding unit 50 variable length codes frequency code component DCoef to output encoded signal Str.

The output of the DCT unit (cosine transform unit) 46 is also input to inverse DCT unit (reverse cosine transform unit) 44. Frequency component FCoef and motion compensated image MCpel output from motion compensation unit 32 are merged by synthesizer 34, and merged image Coef is output. The merged image Coef is stored as is to first memory 38, and is also processed by deblocking filter 36 and the decoded image signal Vout from which coding distortion has been removed is stored to second memory 40.

Figure 10:
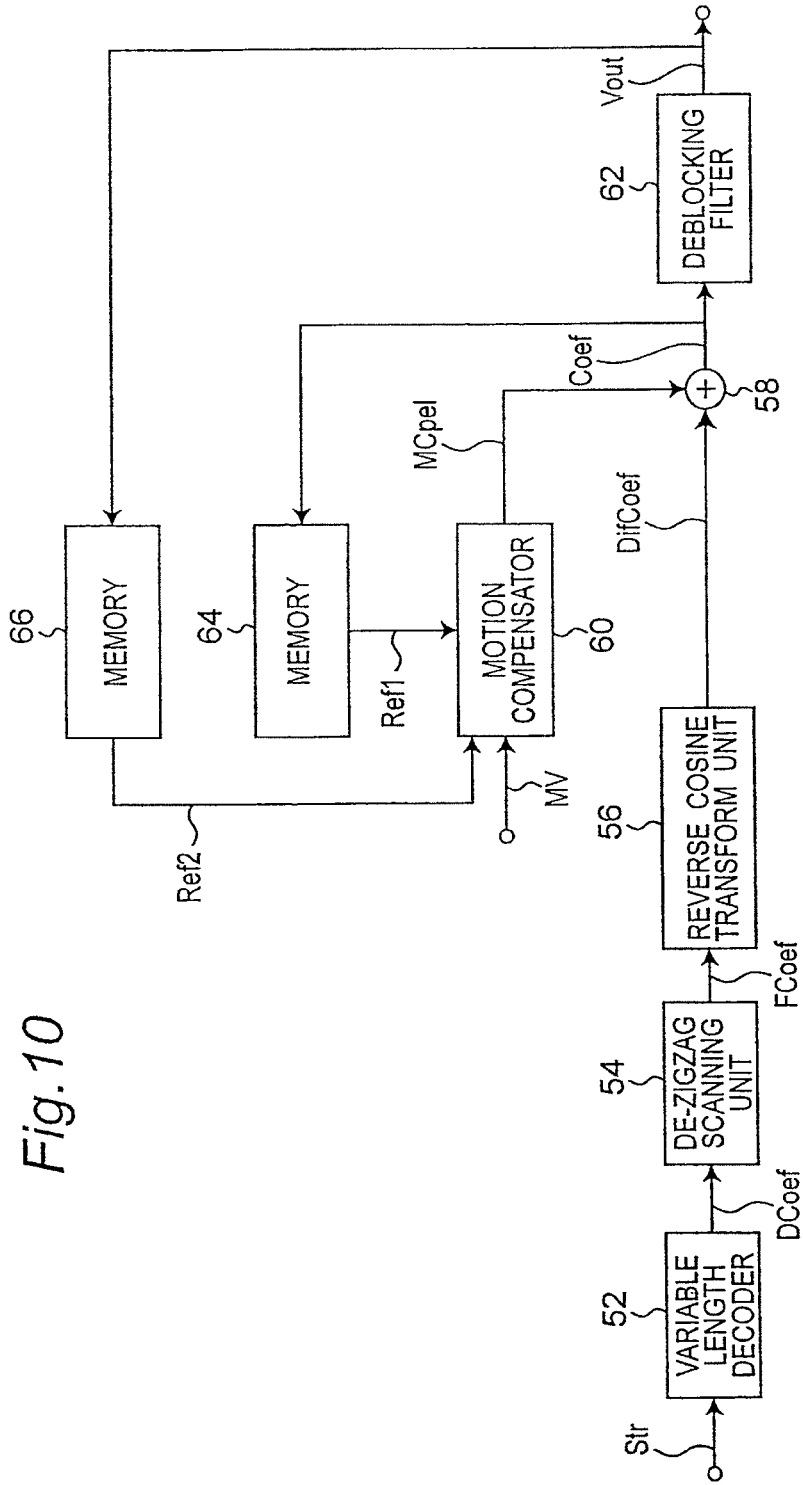
FIG. 10 is a block diagram of a decoding device using a decoding method according to a third embodiment of the present invention.
Figure 33:
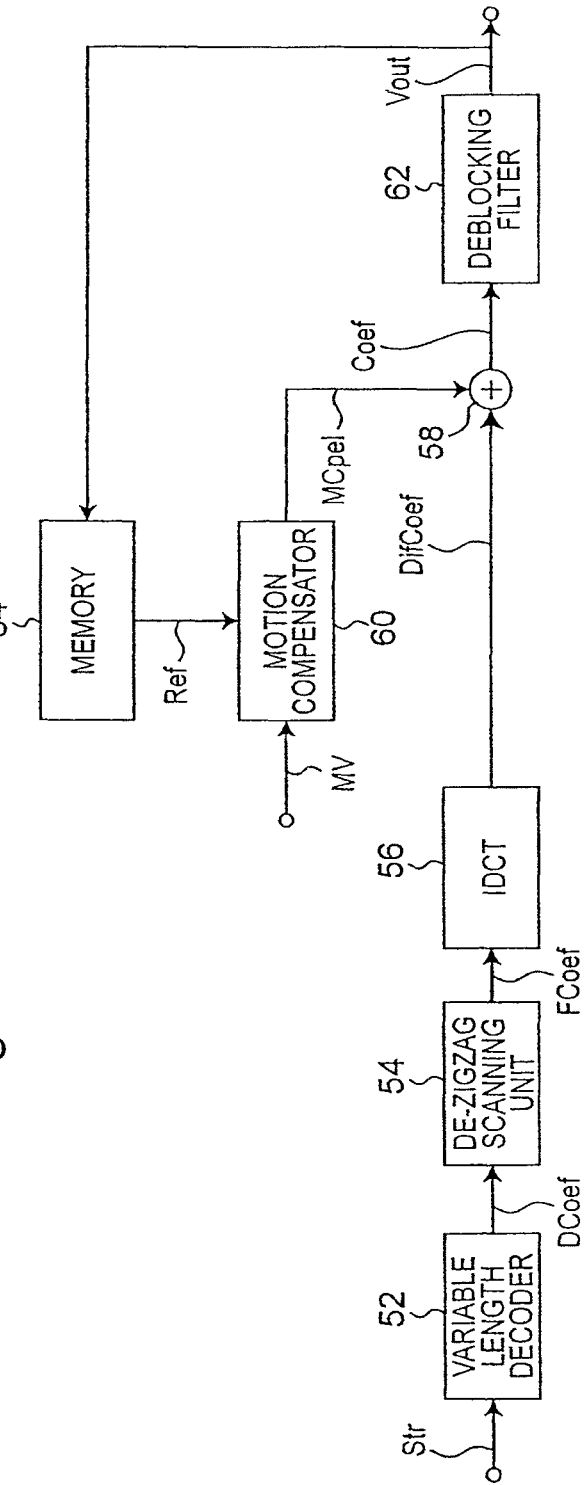
FIG. 33 is a block diagram of a video decoding apparatus using a decoding method of the prior art.

FIG. 10 is a block diagram of the decoding apparatus. This decoding apparatus correctly decodes the encoded signal Str encoded by the encoding apparatus shown in the block diagram in FIG. 9. Parts in FIG. 10 that operate the same as the corresponding parts in FIG. 32 or FIG. 33 are identified by like reference numeral, and further thereof description is omitted here. The inverse DCT unit (reverse cosine transform unit) 56 dequantizes frequency component FCoef and computes the inverse DCT to output difference image DifCoef. The adder 58 adds difference image DifCoef and motion compensated image MCpel to obtain reconstructed image Coef. Reconstructed image Coef is stored to first memory 64, and decoded image signal Vout obtained by deblocking filter 62 removing coding distortion from reconstructed image Coef is stored to second memory 66.

As a result of this operation an image from which coding distortion is not removed is stored to first memory 38 and first memory 64, and an image from which coding distortion is removed is stored to second memory 40 and second memory 66. The coding distortion removal process does not always remove only coding distortion, and it is possible that part of the actual image signal is also lost. The encoding apparatus shown in FIG. 9 is therefore configured so that the motion detection unit 30 can always select the best output from both first memory 38 and second memory 40.

If part of the original image signal is lost by removing coding distortion with the configuration of this embodiment, an appropriate reference image can be selected by referencing first memory 38. An appropriate reference image can likewise be selected by the decoding apparatus shown in FIG. 10.

It should be noted that a DCT is used as the orthogonal transform in this embodiment of the invention, but a Hadamard transform or wavelet transform could be used.

Embodiment 4

Figure 11:
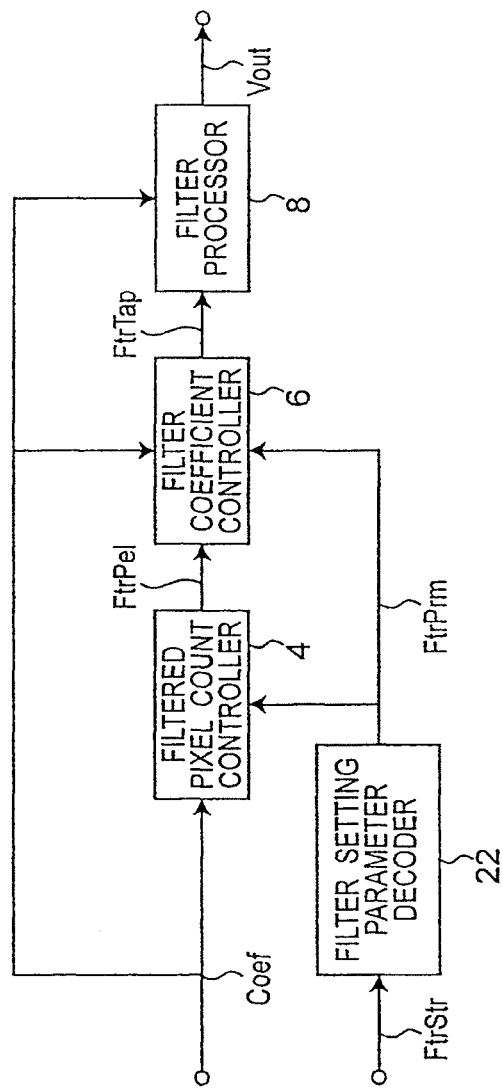
FIG. 11 is a block diagram of a coding distortion removal unit using the coding distortion removal method according to a fourth embodiment of the present invention.

FIG. 11 is a block diagram of a coding distortion removal unit according to a preferred embodiment of the invention, and corresponds to the deblocking filter 62 shown in FIG. 1, for example. This coding distortion removal unit is distinguished by determining the threshold value for setting the filter. It should be noted that parts performing the same operation as like parts in the coding distortion removal unit shown in FIG. 34 are identified by like reference numerals and further description thereof is omitted here.

Filter setting parameter decoder 22 decodes filter setting parameter signal FtrStr, and outputs filter parameter FtrPrm. This filter setting parameter signal FtrStr is not a threshold value, but is a parameter for setting the threshold value. Filter parameter FtrPrm is equivalent to $\pi$, $\Omega$, and $\phi$ in FIG. 5. By decoding and obtaining data optimizing these parameters $\pi$, $\Omega$, and $\phi$ for each picture from filter setting parameter signal FtrStr, coding distortion removal appropriate to the image is enabled.

Figures 12A, 12B, 12C, 12D:
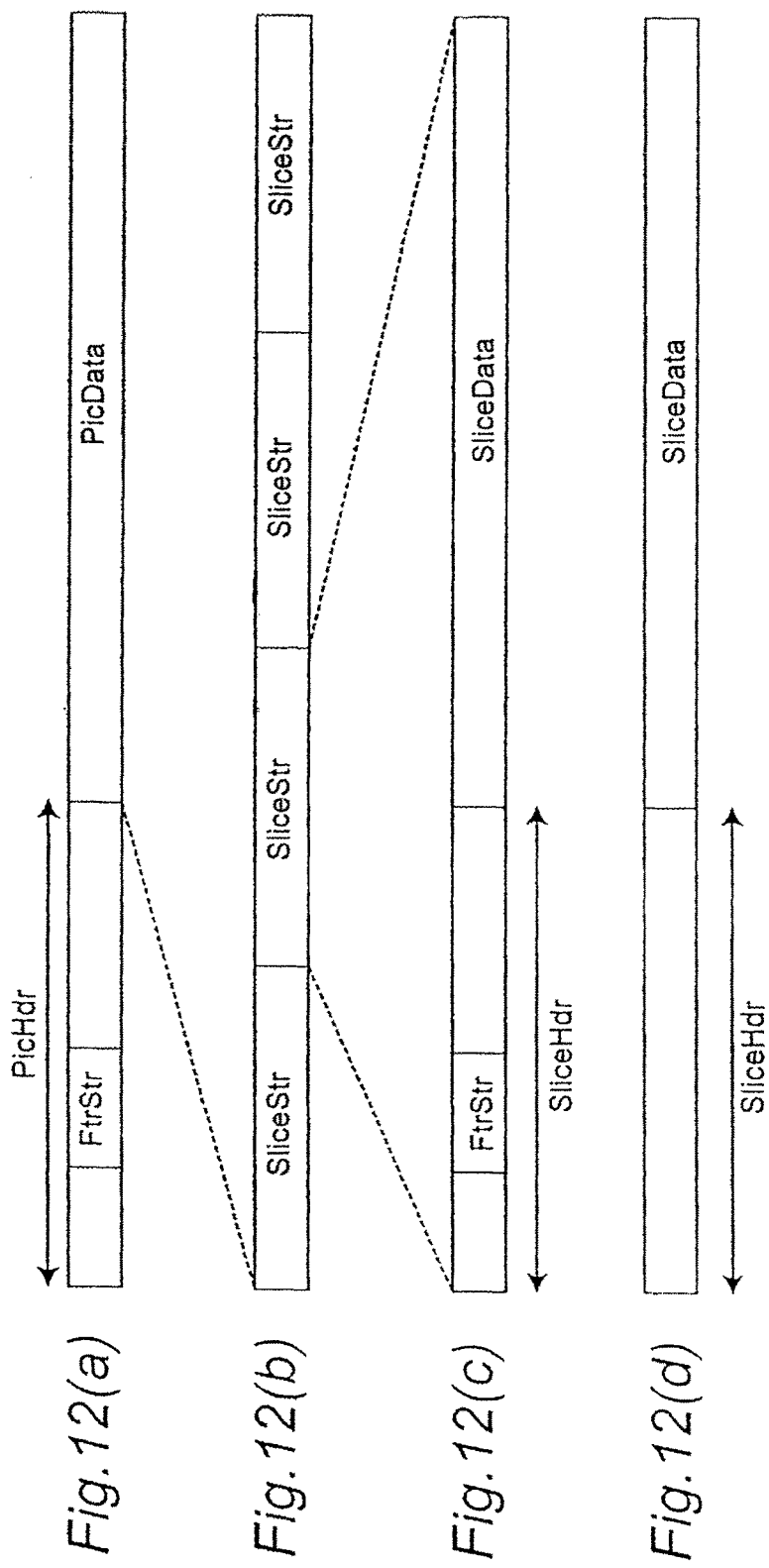
FIGS. 12(a), 12(b), 12(c) and 12(d) show the structure of the encoded signal Str in a coding distortion removal method according to a fourth embodiment of the present invention.

FIG. 12 shows the structure of encoded signal Str in the coding distortion removal method of the present invention. FIG. 12 (a) is an encoded signal for one picture, and contains picture data PicData holding the data for one picture, and picture header PicHdr common to all data in one picture. This picture header PicHdr contains the filter setting parameter signal FtrStr.

FIG. 12 (b) shows the structure of picture data PicData. This picture data PicData contains slice signal SliceStr, the encoded signal of a slice containing a group of plural block units.

FIG. 12 (c) shows the structure of slice signal SliceStr, which contains slice data SliceData holding the data for one slice, and slice header SliceHdr common to all data in the one slice. By writing filter setting parameter signal FtrStr to the slice header SliceHdr, an encoded signal received in slice data SliceData units can be correctly decoded.

If plural slice signals SliceStr are contained in picture data PicData, filter setting parameter signal FtrStr could be written to only some of the slice headers SliceHdr instead of writing filter setting parameter signal FtrStr to all slice headers SliceHdr. If the content of the filter setting parameter signal FtrStr is common to each slice, and filter setting parameter signal FtrStr is not written to the slice header SliceHdr as shown in FIG. 12 (c), an increase in the number of bits due to repeating the filter setting parameter signal FtrStr can be suppressed by substituting filter setting parameter signal FtrStr from another slice header SliceHdr.

If the encoded signal Str is transmitted in small data units such as packets instead of as a single continuous bit stream, the header and non-header parts can be separately transmitted. In this case the header and data parts will not be in a single bit stream as shown in FIG. 12. However, even if the transmission sequence of the header and data parts is not continuous, the header for a particular data packet is simply transmitted in another packet, and the concept is the same as the bit stream shown in FIG. 12 even though the transmission is not a single bit stream.

FIG. 13 is a block diagram of the encoding apparatus. Note that like parts in FIG. 13 and FIG. 9 are identified by like reference numerals and further description thereof is omitted here.

Memory 217 stores image signal Vin, that is, the image signal input for encoding. Image quality comparison unit 216 compares the encoding target image signal read from memory 217 with decoded image signal Vout. The size of the error obtained from the comparison done by image quality comparison unit 216 is stored together with the deblocking filter threshold value for the decoded image to comparison memory 218. The selection unit 219 selects as the optimum threshold value the threshold value of the deblocking filter corresponding to the smallest error stored in comparison memory 218. The selected optimum threshold value is multiplexed as a related added bit stream to the bit stream of the corresponding picture. Based on the optimum threshold value output by selection unit 219, threshold value control unit 215 generates a candidate threshold value for the deblocking filter of the next picture, advises the deblocking filter 36 and changes the threshold value of the coding distortion removal process, and sends the threshold value currently in use to the comparison memory 218.

FIG. 14 is a conceptual representation of the specific encoding apparatus shown in the block diagram in FIG. 13. In FIG. 14 the optimum threshold value selection unit 226 performs the operations of the parts in FIG. 13 other than zigzag scanner 48, variable length coding unit 50, and threshold value appending unit 220, equivalent to the operation of memory 217, image quality comparison unit 216, comparison memory 218, selection unit 219, and threshold value control unit 215. The video encoder 227 corresponds to the operation of the parts other than the memory 217, image quality comparison unit 216, comparison memory 218, selection unit 219, and threshold value control unit 215 in FIG. 13. Threshold value 228 is equivalent to the above optimum threshold value.

The optimum threshold value selection unit 226 selects an optimum threshold value. This optimum threshold value is equivalent to the set of $\pi$, $\Omega$, and $\phi$ values determined for each quantization parameter QP in FIG. 5. The selected optimum threshold value is stored to threshold value memory 228 and applied to video encoder 227 as filter setting parameter signal FtrStr. The encoded filter setting parameter signal FtrStr is processed by the filter setting parameter decoder 22 shown in FIG. 11, for example, in the decoder.

It should be noted that the optimum threshold value could be stored in memory in threshold value control unit 215 shown in FIG. 13, and the threshold value data sent by threshold value control unit 215 to threshold value appending unit 220.

Figure 15:
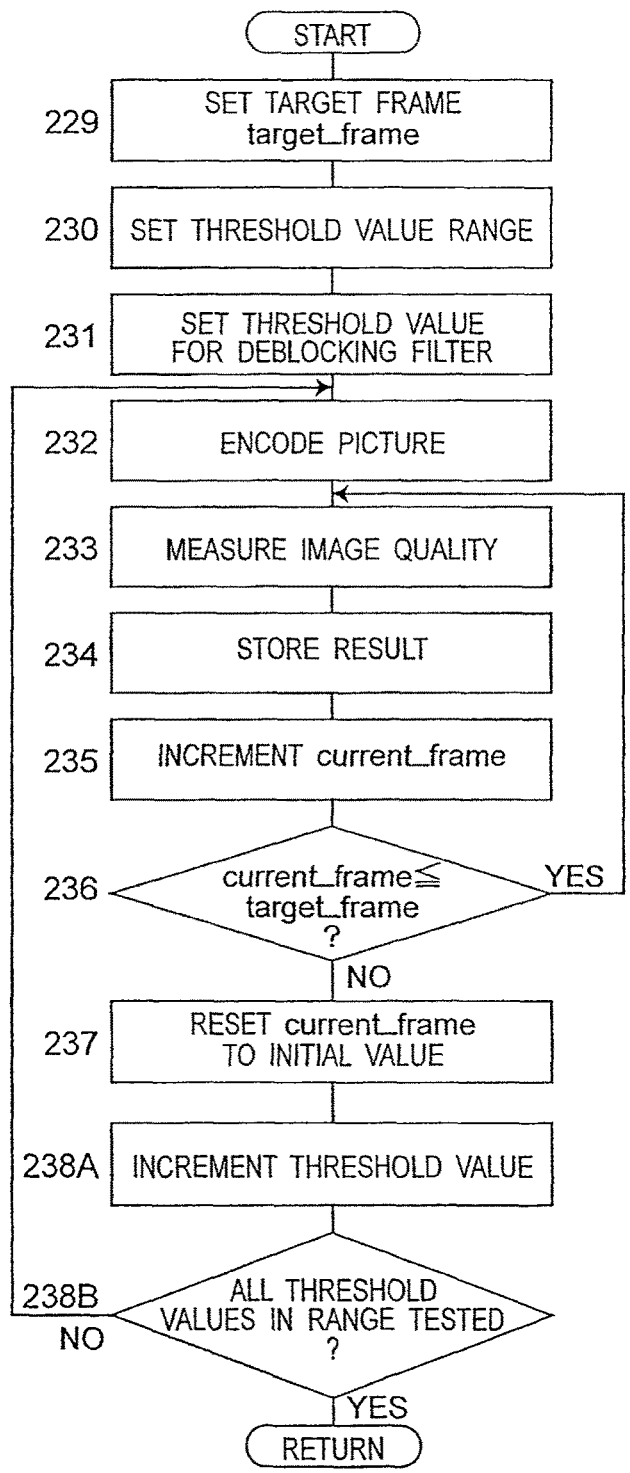
FIG. 15 is a flow chart showing a method for gathering data for finding an optimum threshold value.
Figure 16:
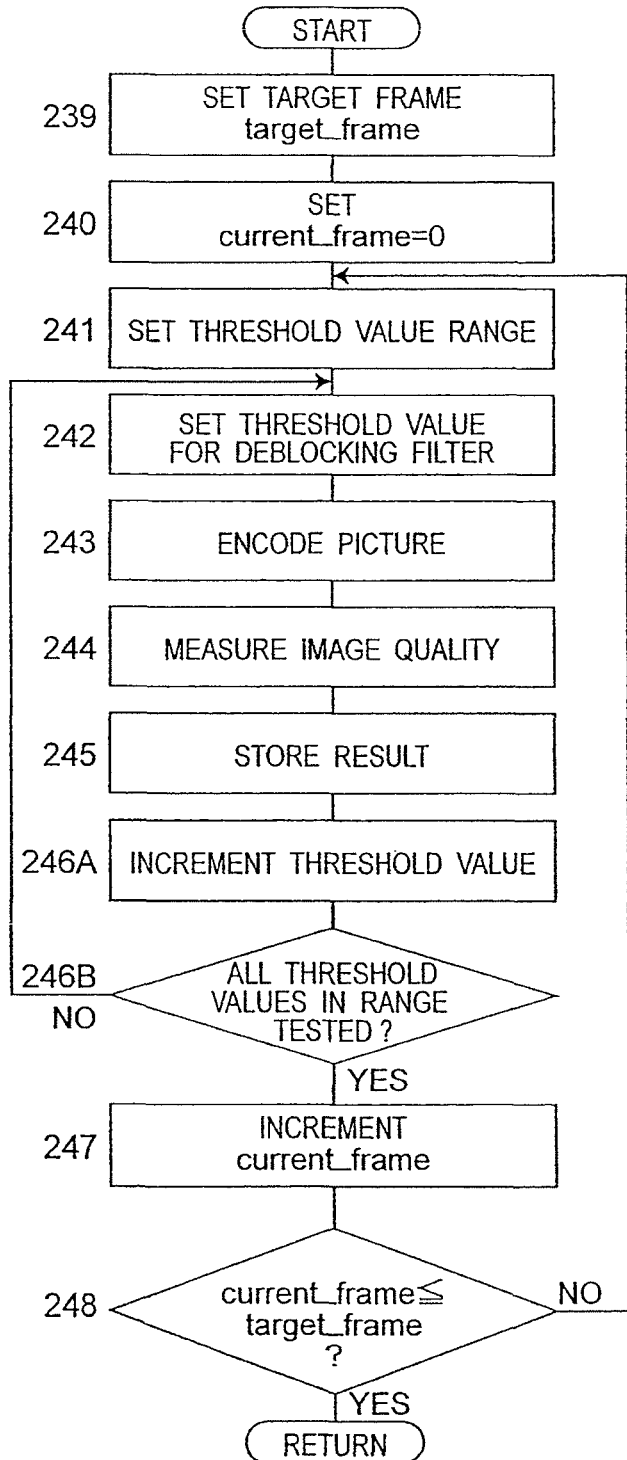
FIG. 16 is a flow chart showing another method for gathering data for finding an optimum threshold value.
Figure 17:
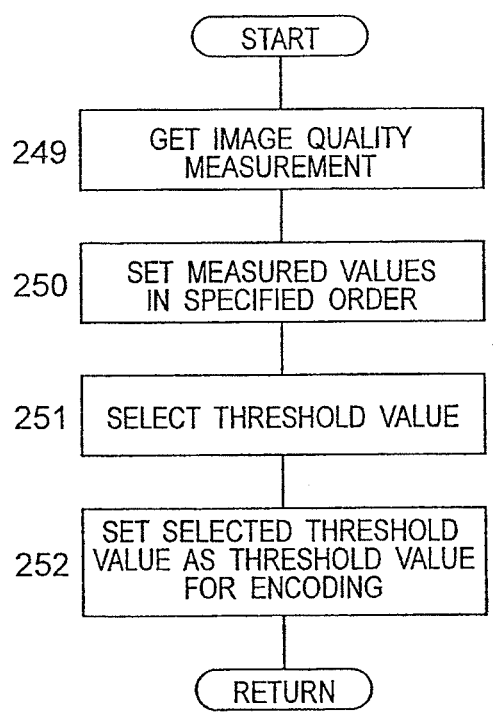
FIG. 17 is a flow chart showing a method for selecting an optimized threshold value.

An operation whereby filter setting parameter signal FtrStr is determined when removing coding distortion is described next. FIG. 15, FIG. 16, and FIG. 17 are flow charts showing the operation of the encoding apparatus described with FIG. 13 and FIG. 14.

FIG. 15 is a flow chart of an operation for measuring image quality.

The target frame target_frame is first set and the first picture output (step 229). The target frame target_frame is the picture used for deriving the threshold value.

The threshold value control unit 215 then sets a threshold value range (step 230), and the value at one end of this range is output from threshold value control unit 215 as the initial threshold value (step 231).

Using this initial threshold value the deblocking filter 36 removes coding distortion, begins coding the picture for target frame target_frame (step 232), and image quality comparison unit 216 then measures the image quality of this first encoded picture and image signal Vin (step 233).

The result of this comparison is stored to comparison memory 218 (step 234), and the current frame number current_frame is incremented (step 235). That is, the picture being processed is changed from the first picture to the next picture, and the next picture is output to, for example, optimum threshold value selection unit 226 and video encoder 227 shown in FIG. 14 or memory 217, motion detection unit 30, and subtracter 42 shown in FIG. 13.

Step 236 then determines if the current frame number current_frame has reached the target frame target_frame. If it has not, steps 233 to 235 repeat. The image quality of the input picture is measured by image quality comparison unit 216, and the result is stored to comparison memory 218. If the current frame number current_frame equals the target frame target_frame, control advances to step 237 and the current frame number current_frame is reset to the first picture.

The threshold value control unit 215 then increments the threshold value (step 238A), that is, the threshold value is set to the next value. This "next value" is the value increased a specific increment from the first value.

Whether all threshold values to the threshold value at the other end of the set range have been tested is then determined (step 238B). If all threshold values have been tested, the process for determining the optimum threshold value ends. If all threshold values have not been tested, control loops back to step 232 and the picture for target frame target_frame is encoded.

Image quality can thus be measured by measuring the image quality for all target frames target_frame using one threshold value, then incrementing the threshold value a specific amount, and then again measuring image quality for all target frames target_frame.

Referring next to the flow chart in FIG. 16, a method for measuring image quality in one picture using all threshold values in a set threshold value range, then advancing to the next picture and measuring image quality using all threshold values in a set threshold value range, is described.

The target frame target_frame is first set and the first picture output (step 239). The current frame number current_frame is then initialized to 0 (step 240).

The threshold value control unit 215 then sets a threshold value range (step 241), and the threshold value is set to the deblocking filter 36 (step 242).

The first picture is then encoded (processed for coding distortion removal) using the initial threshold value (step 243), and the image quality of the encoded picture is measured by image quality comparison unit 216 (step 244).

The result output by image quality comparison unit 216 is stored to comparison memory 218 (step 245), and the threshold value control unit 215 increments the threshold value to the next value (step 246A).

Whether all threshold values have been tested is then determined (step 246B). If all threshold values have not been tested, control loops back to step 242 and the image quality of the same picture is measured using a different threshold value. If all threshold values have been tested, control advances to step 247.

The current frame number current_frame is then incremented in step 247. That is, the picture being processed is changed from the first picture (the first frame) to the second picture (the second frame), and the next picture is output to, for example, optimum threshold value selection unit 226 and video encoder 227 shown in FIG. 14 or memory 217, motion detection unit 30, and subtracter 42 shown in FIG. 13.

Step 248 then determines if the current frame number current_frame has reached the target frame target_frame. If it has not, steps 241 to 247 repeat. If current_frame equals target_frame, the image quality measurement process ends.

FIG. 17 is a flow chart of a method for selecting the optimum threshold value based on the threshold value described in FIG. 15 or FIG. 16 and the results of measuring image quality at that threshold value.

The selection unit 219 gets the image quality measurement results and corresponding threshold value data in step 249 in FIG. 17.

The measurement results are then arranged in a specific order (step 250).

The picture with the best image quality is then selected based on specific conditions (step 251), and the threshold value for that picture is selected as the optimum threshold value. These specific conditions could be any one of or a combination of the following: a low S/N ratio, the smallest difference between the reconstructed image (the picture deblocked at the threshold value) and the original picture (input image signal Vin), and the lowest mean square of the difference.

The selected optimum threshold value is then output as filter setting parameter signal FtrStr to, for example, video encoder 227 in FIG. 14 (step 252).

The best threshold value can thus be selected using the method described with reference to FIG. 17.

As described above this preferred embodiment measures image quality for all threshold values in a specified range, gathers the image quality measurement results, and selects the optimum threshold value from among the results. It is also possible to measure image quality in sequence for all threshold values in a threshold value range, end image quality measurement at the point a result with the best image quality is detected, and select the threshold value producing that image quality result as the optimum threshold value. This method can reduce the number of image quality measurements performed.

The coding distortion removal process for a given block compares the pixel values in that block with the pixel values in an adjacent block. The adjacent block in this case is a block for which the coding distortion removal process has ended and pixel value correction has ended.

Figure 18:
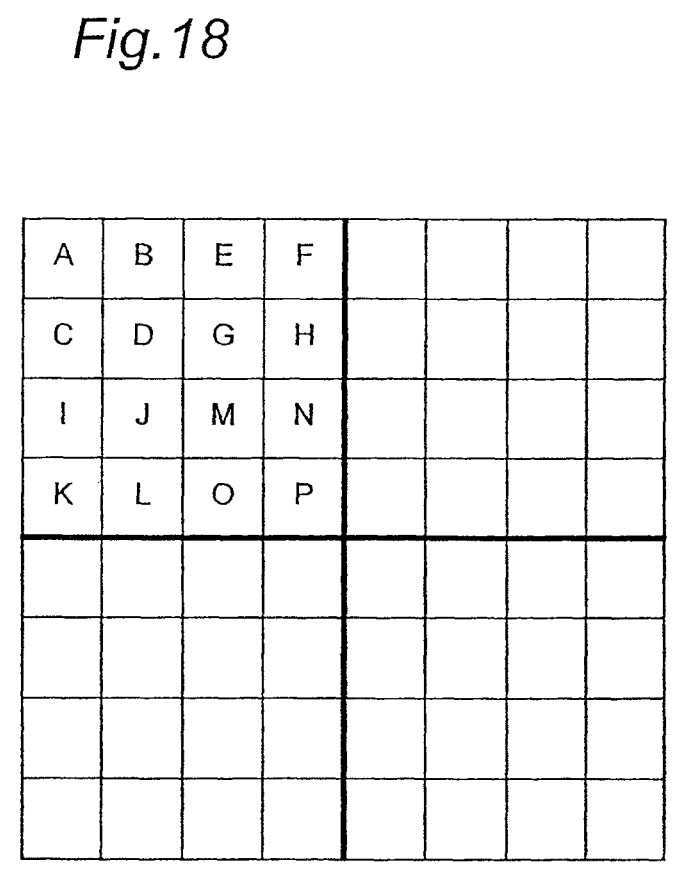

When removing coding distortion from block G in FIG. 18, for example, coding distortion could be removed by comparison with any of the four adjacent blocks E, D, H, and M. However, by using a block for which coding distortion removal processing has already been completed, coding distortion can be removed more accurately.

Coding distortion is preferably removed in linear sequence in the to scanning order. That is, coding distortion is removed in the scanning direction of the horizontal scan lines of the picture in horizontal scan line sequence.

In other words, referring to FIG. 18, the first scan line of blocks A, B, E, F is processed first for coding distortion removal, then the next line of blocks C, D, G, H is processed, and so forth. Each block has four boundaries, but coding distortion removal processing is preferably applied using the adjacent blocks touching the top boundary and left boundary.

In this case coding distortion removal processing is not applied to block A because there is an adjacent block touching its top boundary or left boundary.

There is similarly no adjacent block touching the top boundary of block B, and deblocking is therefore applied using block A, which is adjacent to the left boundary of block B.

Blocks E and D are respectively adjacent to the top and left boundaries of block G, and coding distortion is therefore removed from block G using blocks E and D while not using blocks H and M.

By thus removing coding distortion between a new block and adjacent blocks from which coding distortion has already been removed, and not referencing adjacent blocks that have not been processed for coding distortion, coding distortion can be removed more accurately.

Embodiment 5

This embodiment first describes a case in which pixels are divided into groups of multiple pixels each, such as groups of four pixels in one column, groups are then paired, and coding distortion removal is applied to group pairs. A coding distortion removal process as used in this embodiment refers to both or either determining whether to apply deblocking to an area on both sides of a block boundary, and the deblocking operation itself. A block could be a 4×4 block of 16 pixels that is the smallest coding unit, or any of the blocks to which motion compensation is applied as described above with reference to FIG. 3.

Figure 19:
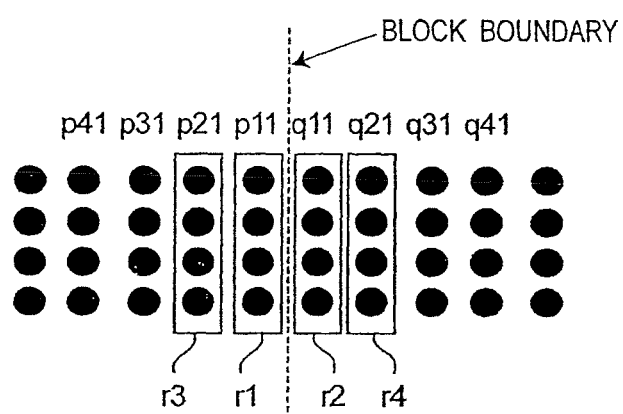
FIG. 19 shows a group containing multiple pixels.

As shown in FIG. 19 the four pixels in one group are a group of four pixels arranged in line with the block boundary. Four such groups are shown in FIGS. 19, r1, r2, r3, and r4. Data from these four groups r1, r2, r3, and T4 can be stored to four registers (SIMD registers, for example). Groups r1, r2 and groups r3, r4 are symmetrically located on left and right sides of the block boundary. Pixel values in group r1 are compared with pixel values in group r2, and coding distortion removal processing is applied using the resulting differences.

More specifically, difference 1 between the top pixel in group r1 and the top pixel in group r2, difference 2 between the second to the top pixel in group r1 and the second to the top pixel in group r2, difference 3 between the second to bottom pixel in group r1 and the second to bottom pixel in group r2, and difference 4 between the bottom pixel in group r1 and the bottom pixel in group r2 are obtained. The average of difference 1, difference 2, difference 3, and difference 4, or the sum of the absolute values of difference 1, difference 2, difference 3, and difference 4, is used as a representative difference, and this representative difference is compared with a specific threshold value. Other methods are also possible. Because these operations are performed on units of four pixels in the same groups, parallel processing can be used for significantly faster throughput compared with processing each pixel at a time.

While comparison using just group r1 and group r2 is described above, if greater accuracy is required the luminance of pixels in group r3 can be compared with pixel luminance values from group r4, and the representative differences from the comparison of groups r1 and r2 can be added to or averaged with the representative differences from groups r3 and r4 to remove coding distortion.

The operation described above applies to vertical block boundaries, but the same essential operation can be applied to horizontal boundaries by simply assembling horizontal groups of four pixels along the horizontal boundaries.

Figure 20A:
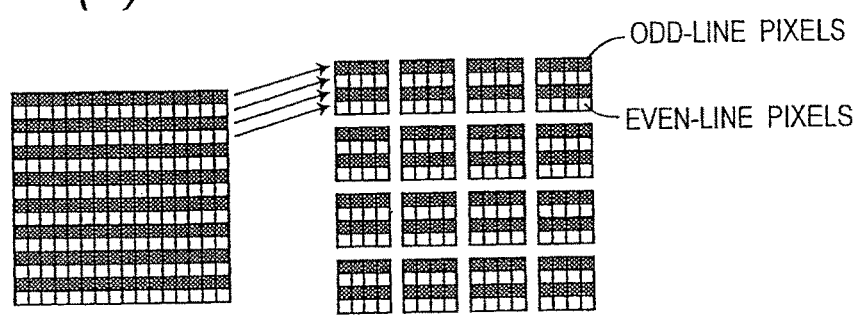
FIG. 20 (a) describes a frame structure and FIG. 20(b) describes a field structure.
Figure 20B:
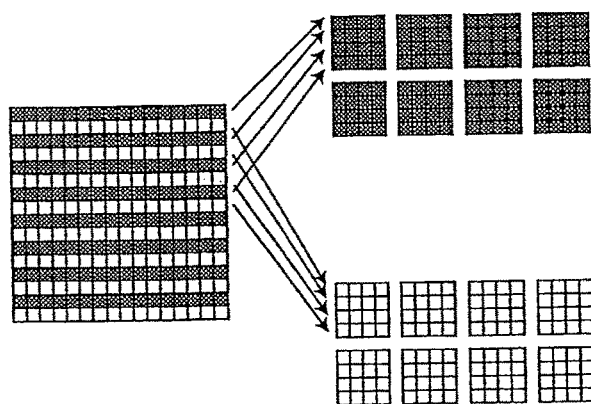

FIGS. 20 (a) and (b) show cases in which the scan lines are interlaced on screen. An interlaced picture is a picture in which one frame consists of two fields presented at different times. Coding and decoding an interlaced picture can be accomplished by processing one frame as a frame, as two fields, or by frame structure or field structure blocks in one frame. In FIG. 20 the small gray squares denote odd-line pixels, and the small white squares denote even-line pixels. The gray pixels of the odd lines thus form one field of a frame and the white pixels on the even lines form the other field of the same frame.

In an interlaced picture signal one frame consists of two fields (an even field and an odd field) at different time instants. In a still picture the pixel values do not change with time, and the correlation between vertically adjacent lines in a frame is stronger than the correlation between vertically adjacent lines in a field. In a moving picture, however, the picture changes greatly with time, pixel values can thus differ greatly in two fields, and the correlation between vertically adjacent lines in a field is stronger than the correlation between vertically adjacent lines in a frame. It is therefore more efficient to process still pictures by frame and moving pictures by field.

In an interlaced picture (1) all blocks could be frame structure blocks (the frame structure is described further below), (2) all blocks could be field structure blocks (the field structure is described further below), or (3) the picture could contain both frame structure and field structure blocks.

If the picture contains all frame structure blocks (1), all deblocking is applied by frame structure unit. If the picture contains all field structure blocks (2), all deblocking is applied by field structure unit. If the picture contains both frame structure and field structure blocks (3), deblocking is applied while adaptively converting from field structure to frame structure or from frame structure to field structure. These operations are described more specifically below.

Interlaced pictures that are still images or contain little motion are processed by frame units consisting of odd fields and even fields as shown in FIG. 20 (a) (referred to herein as a "frame structure"). In a frame structure, as shown on the right side in FIG. 20 (a), a block of 16 pixels contains both odd-line pixels and even-line pixels. The coding distortion removal process is applied between blocks with a frame structure. That is, as described with reference to FIG. 8 (b), coding distortion removal processing is applied to the block boundaries.

Interlaced pictures with much motion are processed by field unit separated into odd fields and even fields as shown in FIG. 20 (b) (referred to herein as a "field structure"). As shown on the right side in FIG. 20 (b), the picture is separated into odd fields of odd-lines and even fields of even-lines; odd fields contain blocks of odd-lines, and even fields contain blocks of even-lines. The coding distortion removal process is applied only between field structure blocks of only odd-lines or field structure blocks of only even-lines.

Figure 21A:
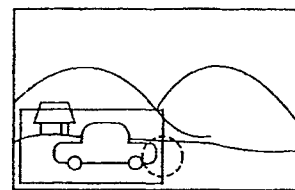
FIG. 21 (a) describes a structure where a frame structure and a field structure are mixed in a single picture, and FIG. 21(b) and FIG. 21(c) describe steps in the coding distortion removal process at the boundary between a field structure and frame structure.
Figure 21B:
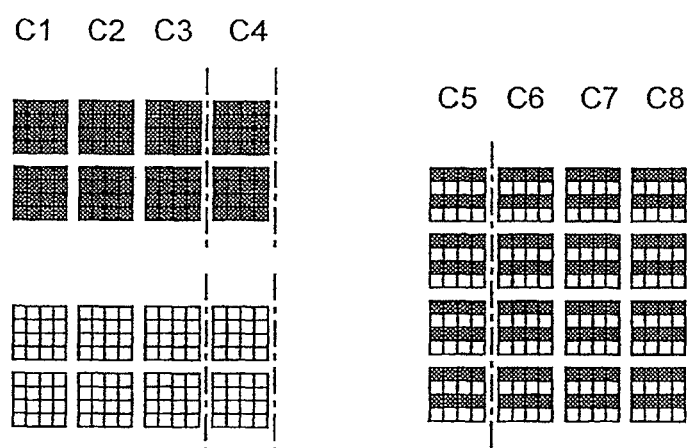
Figure 21C:
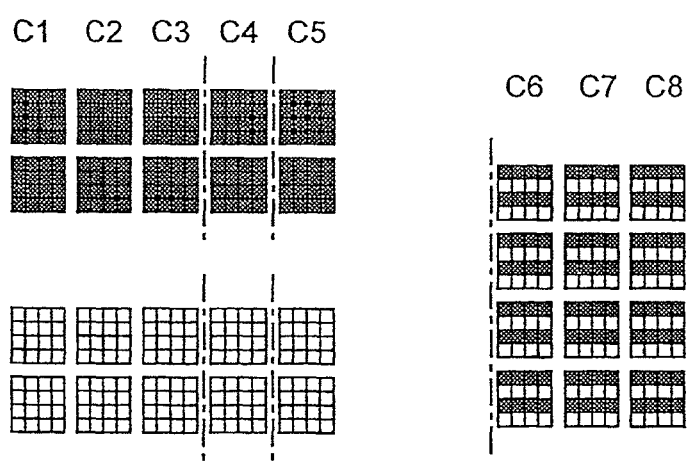

FIG. 21 (a) shows a case in which part of the interlaced image consists of frame structure blocks and another part consists of field structure blocks. Preferably, the moving picture part of the image contains the field structure blocks and the still picture part contains the frame structure blocks. The smallest unit formed by a field structure or frame structure is the macroblock, i.e., the largest unit to which DCT or other orthogonal transform or motion compensation is applied (or super-macroblocks of plural macroblocks). It is assumed below that the rectangle containing the car in FIG. 21 (a) contains field structure blocks, and the rest of the picture contains frame structure blocks.

How coding distortion removal is applied to the boundary between the field structure part and the frame structure part is described next.

Referring to FIG. 21 (b), the blocks in columns C1, C2, C3, and C4 belong to the image area containing the car and thus have a field structure because of the motion in this image area. The blocks in columns C5, C6, C7, and C8 belong to the area where the car is not, that is, the still picture area, and thus have an efficient frame structure. Note that in this example the macroblocks have 16 pixels per side and the blocks have 4 pixels per side. Columns C4 and C5 are shown apart in FIG. 21 (b) but are actually adjacent in the picture. Coding distortion removal as shown in FIG. 8 (b) is applied to the block boundary between columns C3 and C4 and the block boundary between columns C5 and C6.

To process the block boundary between columns C4 and C5 the frame structure blocks in column C5 are first converted to field structure blocks as shown in FIG. 21 (c). This is done by, for example, converting the odd-line pixels in column C5 shown in FIG. 21 (b) to a block of gray pixels in column C5 as shown in FIG. 21 (c), and converting the even-line pixels in column C5 shown in FIG. 21 (b) to a block of white pixels in column C5 as shown in FIG. 21 (c). Coding distortion at the block boundary between columns C4 and C5 is then removed as shown in FIG. 8 (b).

Frame structure blocks are thus converted to field structure blocks because the vertical correlation between pixels will be lost if field structure blocks are converted to frame structure blocks when there is movement in the picture, and unnatural degradation occurs if the coding distortion removal process is applied between vertically adjacent blocks. On the other hand, while suppression of coding error in high frequency components in the vertical direction is reduced if frame structure blocks are converted to field structure blocks in still pictures, the vertical correlation between pixels is not lost and unnatural image quality degradation does not occur easily.

Frame structure blocks are converted to field structure blocks to reduce the amount of processing (only converting frames to fields) in the above example. However, if the number of operations is not of concern, an alternative method can be used that converts frames to fields and field to frames, and thus increases the number of operations compared with the previous example because of the additional processing required to convert fields to frames. More specifically, whether the target pixels for coding distortion removal (i.e., the current pixel for which the pixel value is to be changed by deblocking) are in a frame structure block or a field structure block is first determined. If the target pixels for coding distortion removal are in a field structure block, frame structure blocks are converted to field structure blocks (i.e., the block type of the target pixel), and if the target pixels for coding distortion removal processing are in a frame structure block, field structure blocks are converted to frame structure blocks (i.e., the block type of the target pixel).

Operation when frame structures and field structures are mixed is described next with reference to the flow chart in FIG. 22.

A frame in an interlaced image signal stream consists of two fields scanned at different time instants. A frame can therefore be frame encoded by combining the two fields into a single coding unit (frame structure coding), or it can be field encoded with the two fields coded and handled separately (field structure coding). These coding methods can also be grouped into the following two categories, fixed coding and adaptive coding. With fixed coding the entire picture is switched between either frame coding or field coding. With adaptive coding the picture is divided into a number of blocks and each block is either frame encoded or field encoded.

Fixed coding further includes frame-fixed coding applied to frame structure blocks, and field-fixed coding applied to field structure blocks. With fixed coding the interlaced video sequence is always encoded with either frame encoding or field encoding regardless of the content.

With adaptive coding, however, frame encoding or field encoding can be adaptively selected based on the content, the picture, or coding block unit in the picture. These in-picture coding blocks can be as small as the macroblock. With adaptive coding individual macroblocks can therefore be coded using either frame encoding or field encoding. Macroblocks are used as the coding unit below.

Frame encoded blocks, that is, blocks with a frame structure, can be processed for coding distortion removal using the same technique applied to non-interlaced video.

With field encoded blocks, that is, blocks with a field structure, the fields are separated into even fields and odd fields, each field is handled as a separate picture, and deblocking is therefore applied to each field.

Referring to the flow chart in FIG. 22, whether the target block is field encoded or frame encoded is decided first (step 63). If the block is field encoded, steps 64 to 69 are run. If the block is frame encoded, steps 70 to 72 run.

Steps 64 to 66 process even field structure blocks, and steps 67 to 69 process odd field structure blocks. Steps 64 to 66 remove coding distortion between white pixels at the boundary between columns C3 and C4 in FIG. 21 (b), and steps 67 to 69 remove coding distortion between gray pixels at the boundary between columns C3 and C4 in FIG. 21 (b).

More specifically, pixel luminance is compared in step 64 to determine whether coding distortion removal is needed. The number of pixels to be filtered is then determined in step 65. Coding distortion is then removed in the field mode in step 66.

Steps 67, 68, and 69 perform the same operations as steps 64, 65, and 66, respectively.

Steps 70 to 72 process frame structure blocks to remove coding distortion at the boundary between columns C5 and C6 in FIG. 21 (b). More specifically, pixel luminance is compared in step 70 to determine whether coding distortion removal is needed. The number of pixels to be filtered is then determined in step 71. Coding distortion is then removed in the frame mode in step 72.

Whether all blocks have been processed is determined in step 73, and if they have operation ends.

Figure 23:
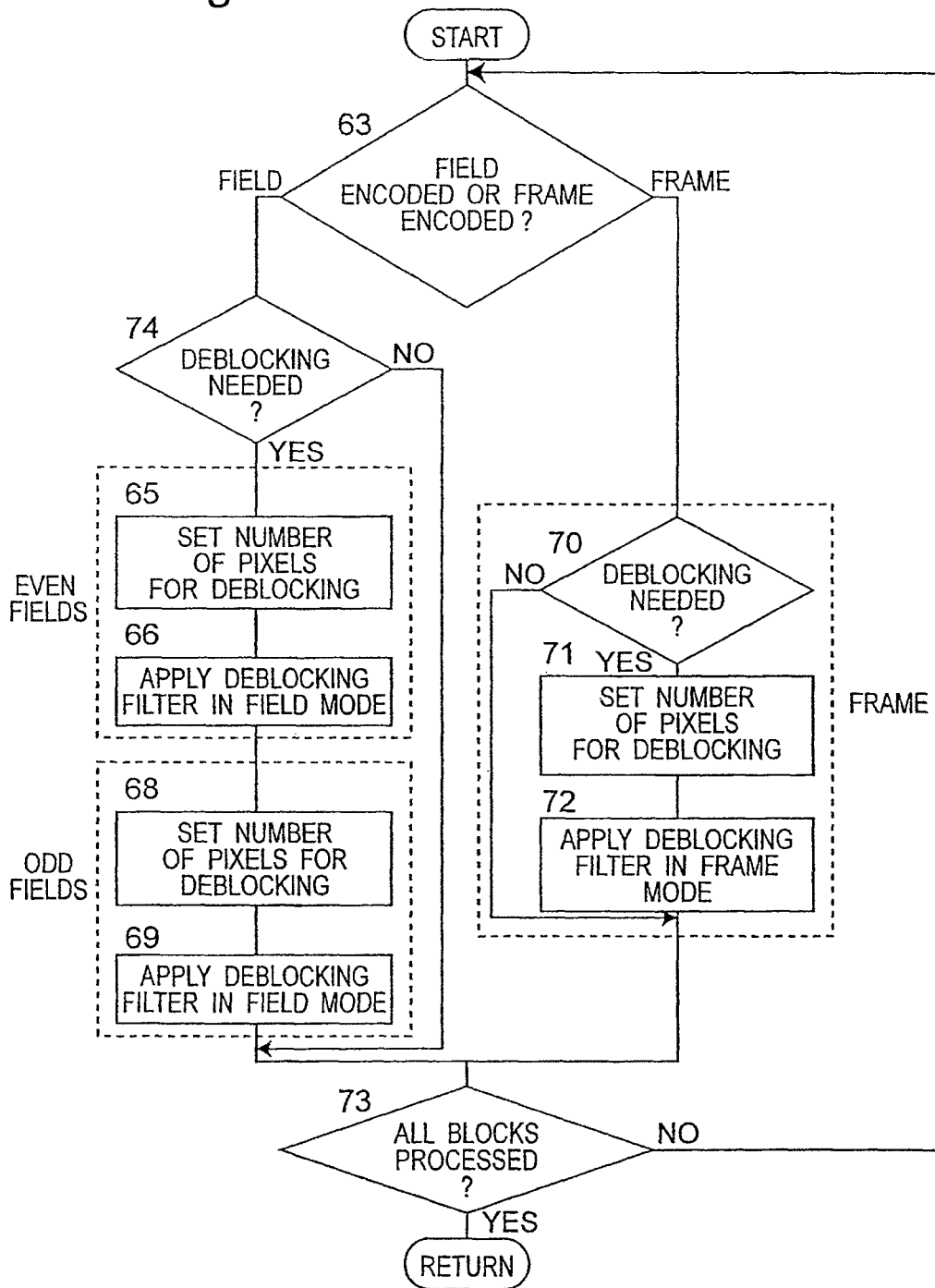
FIG. 23 is a flow chart for a variation in which steps memory 64 and 67 in FIG. 22 are combined.

FIG. 23 shows an alternative method in which steps 64 and 67 in FIG. 22 are combined into a single step. More specifically, whether it is necessary to remove coding distortion from both even field blocks and odd field blocks is determined, and deblocking is applied to both even and odd field blocks if it is needed. This simplifies the coding distortion removal process.

Figure 24:
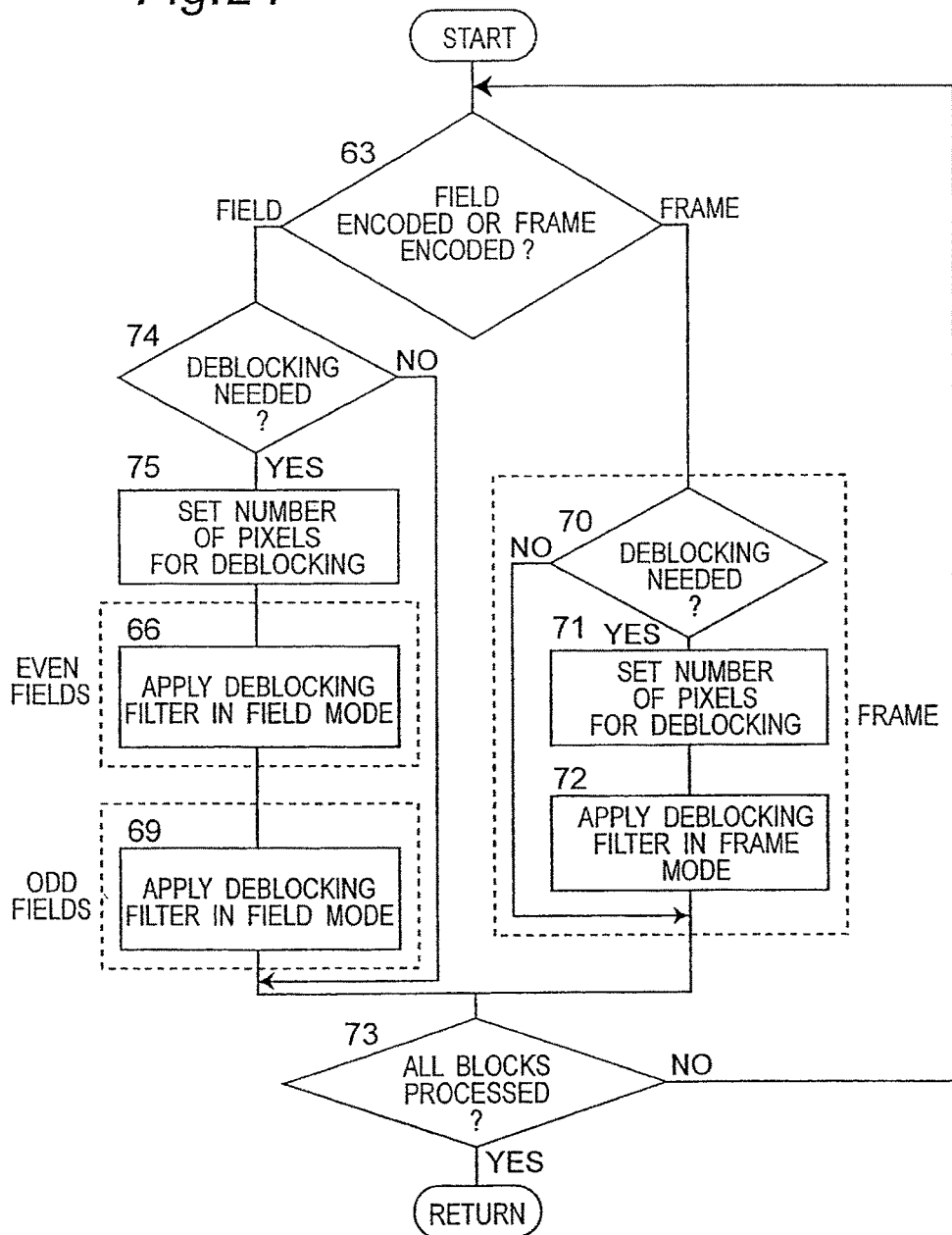
FIG. 24 is a flow chart for a variation in which steps memory 65 and 68 in FIG. 23 are combined.

FIG. 24 shows a further alternative method in which steps 65 and 68 in FIG. 23 are combined into a single operation determining the number of pixels in both the even field blocks and odd field blocks to be deblocked. Coding distortion removal is then applied to both even and odd field blocks based on the result. This method further simplifies coding distortion removal.

Figure 25:
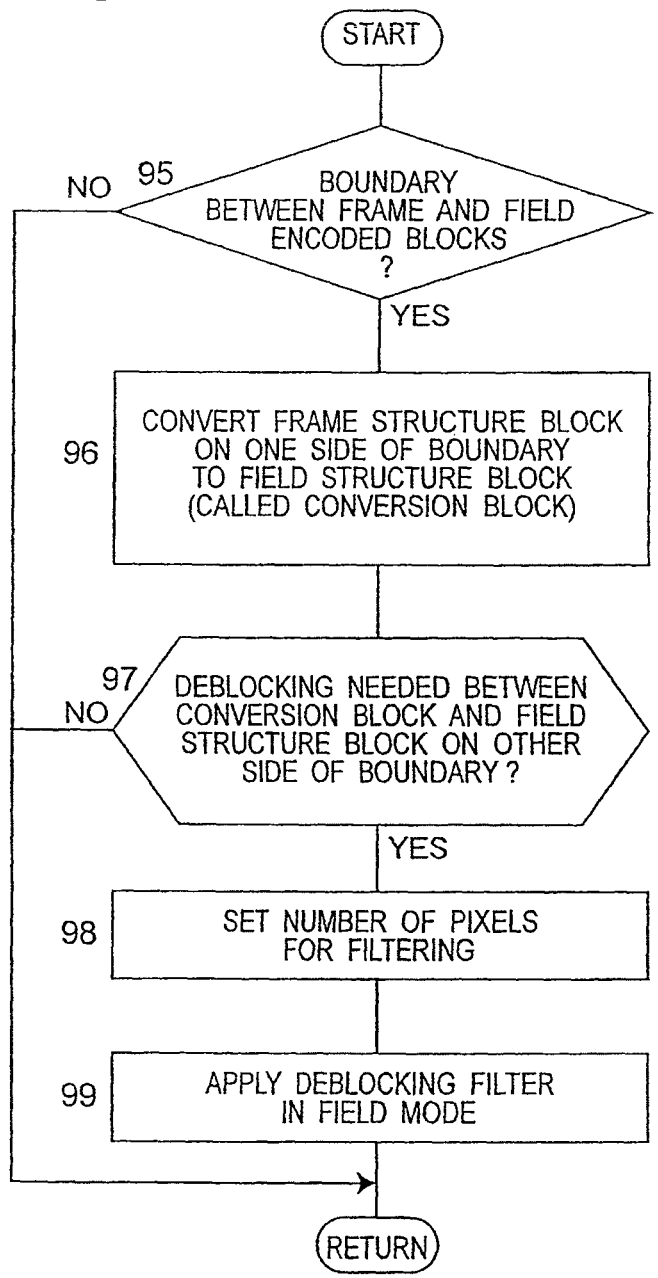
FIG. 25 is a flow chart of a process used when a frame structure block and a field structure block are on opposite sides of the block boundary.

FIG. 25 is a flow chart of a process used when frame encoded blocks and field encoded blocks are mixed in a single picture, and the block boundary is between a frame structure block and a field structure block.

Step 95 first determines if the boundary line between the blocks being processed for coding distortion removal is a specific boundary line, that is, if a frame structure block is on one side of the line and a field structure block is on the other side. This is comparable to determining if the line is between columns C4 and C5 in FIG. 21 (b). If it is (step 95 returns yes), control advances to step 96.

The frame structure block on one side of the boundary is then converted to a field structure block (step 96). This conversion is comparable to converting a block in column C5 in FIG. 21 (b) to a block in column C5 in FIG. 21 (c). The converted block is referred to below as a "conversion block."

Whether coding distortion removal is needed between the conversion block and the field structure block on the other side of the boundary is then determined (step 97). This is comparable to deciding whether deblocking is needed at the boundary between columns C4 and C5 in FIG. 21 (c). If it is needed, control advances to step 98.

The number of pixels to filter is then determined (step 98), and coding distortion is removed in the field mode (step 99).

FIG. 25 shows a method whereby frame structure blocks are converted to field structure blocks and coding distortion is removed from the fields when adaptively coded frame structure and field structure blocks are adjacent, but it is conversely possible to convert field structure blocks to frame structure blocks, and remove coding distortion on a frame basis.

An advantage of removing coding distortion on a field basis as shown in FIG. 25 is that operation is resistant to unnatural image quality degradation because coding distortion is removed using only pixels at the same time instant even in image signals with rapid motion. On the other hand, because the correlation between pixels in the vertical direction is stronger in frames than fields in image signals with little motion, deblocking on a frame basis results in less degradation of high frequency components than does deblocking on a field basis. Both methods thus have advantages, and the equipment manufacturer could select the preferable method or means could be provided so that the user can select the desired method.

Coding distortion removal could also be applied by picture unit (frame or field) instead of by block unit with adaptive coding. The deblocking filter can be simplified by providing one field mode or frame mode deblocking filter for processing picture units. The filter could be fixed in the field mode or frame mode, or it could switch on a picture basis. If the filter switches on a picture basis, the coding apparatus can determine the appropriate mode, and an identification signal denoting whether the deblocking filter of the decoding apparatus should operate in the field mode or frame mode can be added to the code stream header and transmitted to the decoder.

Furthermore, when field or frame mode operation can switch on a block unit basis and deblocking and switching on a field basis is prohibited (by setting a picture parameter to prohibit switching in the picture, for example), coding distortion can be removed by frame units.

It should be noted that the deblocking filter in the first to fifth embodiments described above can be used as a post filter as shown in FIG. 32 or an in-loop filter as shown in FIG. 33.

By storing the data from before the deblocking operation to memory 64, an image from which block distortion has not been removed is referenced as the predictive picture when used as an in-loop filter, and there is slightly more degradation of the encoded image quality compared with using a deblocked picture as the predictive picture.

On the other hand, because the result of removing coding distortion is not used as the reference image when used as a post filter, the decoded image will not be greatly degraded regardless of the type of deblocking filter 62 used. For example, a simple filter performing the fewest operations could be used as the deblocking filter 62 in a cell phone, a device for which low power consumption is a priority, while a high precision, high image quality filter could be used as the deblocking filter 62 in a stationary entertainment system for which image quality is the top priority.

Embodiment 6

By recording a program implementing the steps of the coding distortion removal method, coding method, and decoding method described in the preceding embodiments to a floppy disk or other computer-readable data recording medium, the processes described in the above embodiments can be easily executed on an independent computer system.

Figure 26A:
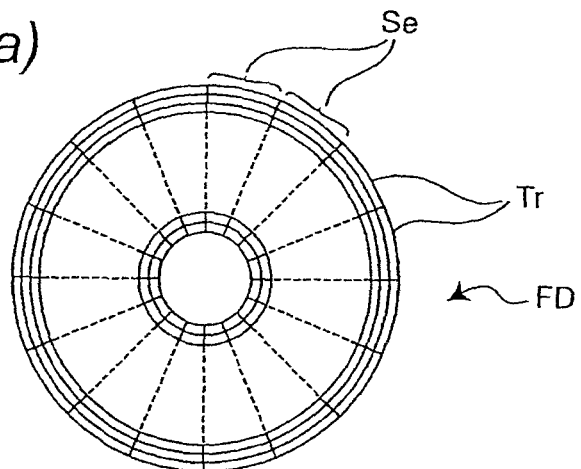
FIGS. 26(a), 26(b) and 26(c) describe a recording medium according to a sixth embodiment of the present invention for storing a computer-executable program implementing the variable length coding and variable length decoding methods of the first and second embodiments of the invention.
Figure 26B:
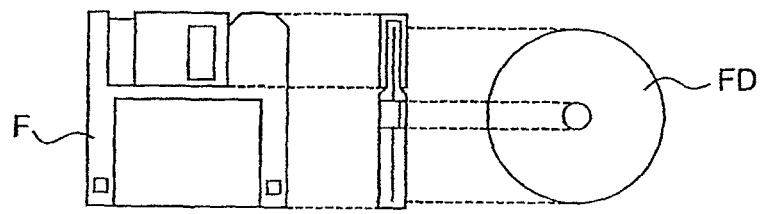
Figure 26C:
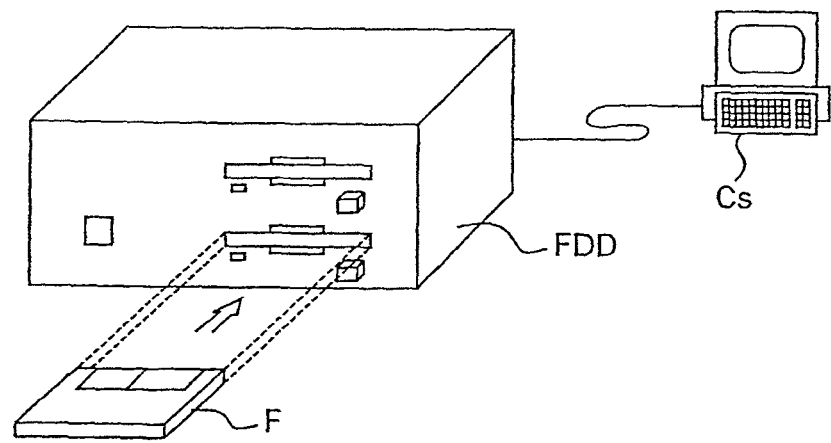

FIG. 26 shows a computer system as a further embodiment of the invention achieved using a data recording medium (a floppy disk in this example) storing the coding distortion removal method, coding method, and decoding method described in the first to fifth embodiments above.

FIG. 26 (*b*) shows a floppy disk as seen from the front, a section view of the same, and the actual disk medium, and FIG. 26 (*a*) shows the physical format of a typical floppy disk recording medium. The floppy disk FD is housed inside a case F. A plurality of concentric tracks Tr are formed from the outside circumference to the inside circumference on the disk surface, and the tracks are divided in the angular direction into 16 sectors Se. A floppy disk FD storing the above program according to the present invention thus has the coding distortion removal method, coding method, and decoding method of the invention recorded as computer-executable programs to specifically allocated areas on the floppy disk FD.

FIG. 26 (*c*) shows an apparatus for recording and reading these programs using this floppy disk FD. To record these programs to the floppy disk FD, the computer system Cs writes the coding distortion removal method, coding method, and decoding method as the programs by means of a floppy disk drive FDD. To execute the coding distortion removal method, coding method, and decoding method on the computer system from the programs stored to the floppy disk FD, the programs are read from the floppy disk FD by the floppy disk drive and transferred to the computer system.

It should be noted that while a floppy disk is described above as the data recording medium, an optical disc or other type of computer-readable medium could be used, including CD-ROM discs, memory cards, ROM cassettes, or any other medium capable of similarly recording the programs.

A system applying the video coding method and video decoding method according to the above embodiments is described next.

FIG. 27 is a schematic diagram showing the overall configuration of a content supply system ex100 for providing a content distribution service. The service area of this communication system is divided into cells of a desired size, and a base station ex107 to ex110 (stationary wireless station) is installed in each cell.

This content supply system ex100 has numerous individual devices such as computer ex111, PDA (Personal Digital Assistant) ex112, camera ex113, cell phone ex114, and a cell phone with a camera ex115 connected to the Internet ex101, for example, by means of Internet service provider ex102, telephone network ex104, and base stations ex107 to ex110.

This content supply system ex100 shall not be limited to the configuration shown in FIG. 27, however, and the desired devices could be selectively connected. The individual devices could also be connected directly to telephone network ex104 without passing through the fixed base stations ex107 to ex110.

Camera ex113 is a digital video camera or other device capable of capturing video images. The cell phone could use any of various protocols, including PDC (Personal Digital Communications), CDMA (code division multiple access), W-CDMA (wideband code division multiple access), GSM (Global System for Mobile Communications), and PHS (Personal Handyphone System).

The camera ex113 can connect via a base station ex109 and telephone network ex104 to a streaming server ex103, which can stream live broadcasts of encoded content sent by a user using camera ex113. The content received from the camera ex113 can be encoded by the camera ex113 or by the server. Video data captured with a camera ex116 can also be sent via computer ex111 to the streaming server ex103. This camera ex116 is a digital camera or other device capable of capturing both still pictures and video. The video data received from the camera ex116 can be encoded by the camera ex116 or by the computer ex111. In either case the video data is processed by LSI device ex117 in the computer ex111 or camera ex116. The software for video coding and decoding can be stored to any computer-readable data recording medium (such as a CD-ROM disc, floppy disk, or hard disk drive) that the computer ex111 can access.

Video data could also be sent by a cell phone with a camera ex115. The video data in this case is encoded by an LSI device in the cell phone with a camera ex115.

With this content supply system ex100, content (such as a live recording of a concert) recorded by the user using camera ex113, camera ex116, or other device is coded as described in the above embodiments of the invention and sent to the streaming server ex103. The streaming server ex103 then streams the content data out to clients requesting the data. The clients could be any device capable of decoding the encoded content, including computer ex111, PDA ex112, camera ex113, and cell phone ex114. This content supply system ex100 thus enables clients to receive and reproduce encoded content data, enables the clients to receive, decode, and play back content in real-time, and is thus a system enabling personal broadcasting.

The video coding apparatus and video decoding apparatus of the present invention described in the above embodiments can be used for coding and decoding by the individual devices in this content supply system ex100.

A cell phone used in this content supply system ex100 is described next by way of example.

Figure 28:
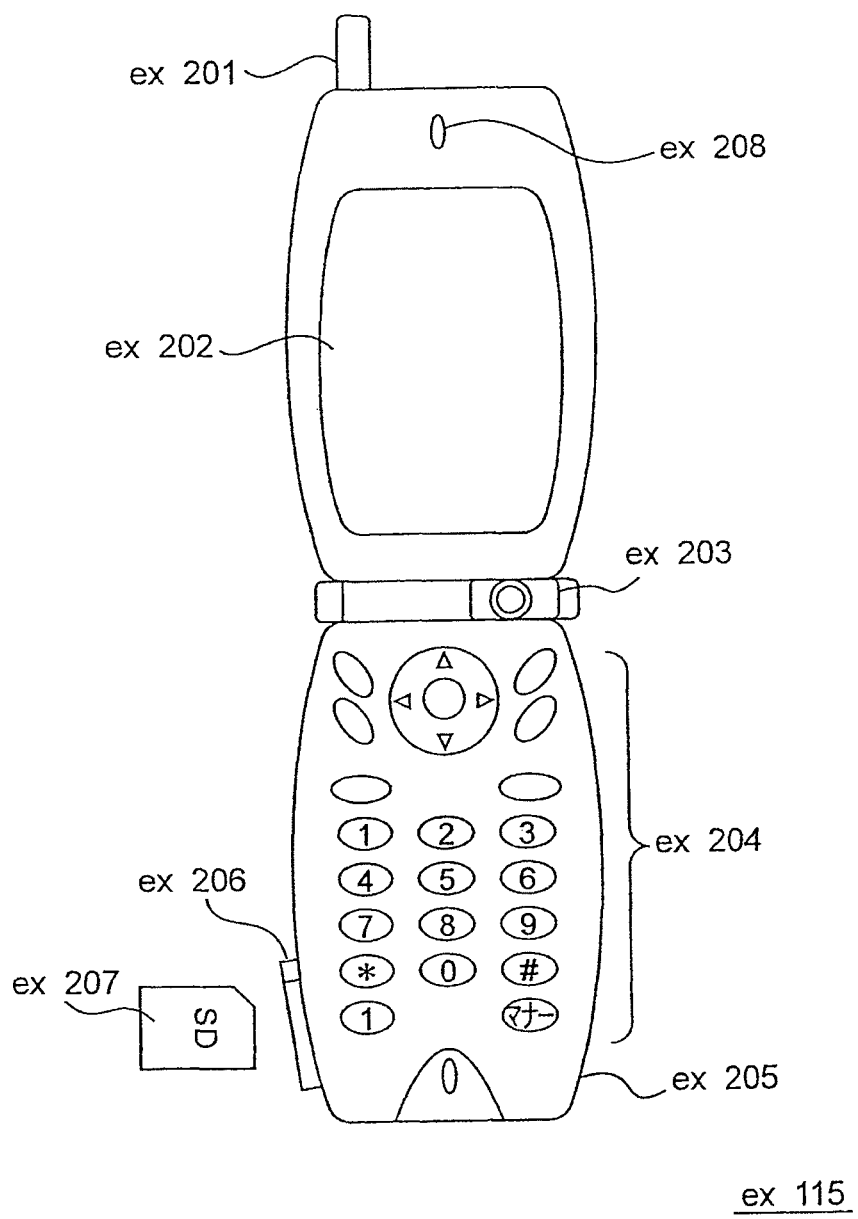
FIG. 28 shows an exemplary cell phone using a video encoding method and video decoding method.

FIG. 28 shows a cell phone ex115 using the video encoding method and video decoding method described above according to the present invention. As shown in FIG. 28 this cell phone with a camera ex115 has an antenna ex201 for exchanging RF signals with a base station ex110; a camera ex203 such as a CCD camera for capturing video and still pictures; a display unit ex202 such as an LCD for displaying images captured by the camera ex203 or images received by antenna ex201 and then decoded; an operating panel with a keypad ex204 and other controls; an audio output unit such as a speaker ex208 for outputting audio; a microphone ex205 or other type of audio input device; recording medium ex207 for storing encoded or decoded data such as video or still image data captured by the camera ex203, received e-mail, or other video or still picture data; and a slot ex206 for loading recording medium ex207 into the cell phone ex115. The recording medium ex207 could be an SD Card or other type of flash memory device such as an EEPROM (electrically erasable and programmable read only memory) housed in a plastic case.

This cell phone ex115 is further described with reference to FIG. 29. Connected to the main controller ex311 for systematically controlling each part of the cell phone ex115 including the display unit ex202 and keypad ex204 via synchronization bus ex313 are a power supply circuit ex310, operating input controller ex304, image encoding unit ex312, camera interface ex303, LCD controller ex302, image decoding unit ex309, multiplexer/demultiplexer ex308, reading/writing unit ex307, modulator/demodulator unit ex306, and audio processing unit ex305.

When the user sets the end and power buttons to the on position, power supply circuit ex310 supplies power from a battery pack to each part of the cell phone ex115 and thus sets the digital cell phone ex115 with camera to the operating mode.

Controlled by the main controller ex311, which typically includes a CPU, ROM, and RAM, cell phone ex115 converts the audio signals picked up by the microphone ex205 when in the talk mode to digital audio data by means of audio processing unit ex305. The modulator/demodulator unit ex306 then spectrum-spreads audio processing unit ex305 output, and the communication circuit ex301 applies D/A conversion and frequency conversion processing, and then outputs through antenna ex201. When in the talk mode the cell phone ex115 amplifies signals received through the antenna ex201 and applies frequency conversion and ND processing, the modulator/demodulator unit ex306 despreads the signal, the audio processing unit ex305 then converts the despread signal to an analog audio signal, and outputs the analog audio signal from speaker ex208.

If e-mail is sent when in the data communication mode, the text data of the e-mail message is input using the keypad ex204, and sent through operating input controller ex304 to main controller ex311. The main controller ex311 then spectrum-spreads the text data using modulator/demodulator unit ex306, D/A converts and frequency conversion processes the signal using communication circuit ex301, and then transmits from antenna ex201 to base station ex110.

To transmit image data when in the data communication mode, image data captured with the camera ex203 is supplied through camera interface ex303 to image encoding unit ex312. If the image data is not transmitted, image data captured with the camera ex203 can be displayed directly on the display unit ex202 by way of camera interface ex303 and LCD controller ex302.

The image encoding unit ex312 has the configuration of an image encoding apparatus according to the present invention. It converts image data supplied from camera ex203 to encoded image data by compression coding using the coding method used in the image encoding apparatus described in the preceding embodiments, and outputs the encoded image data to the multiplexer/demultiplexer ex308. Audio captured by the microphone ex205 of cell phone ex115 while recording with the camera ex203 is also sent to the multiplexer/demultiplexer ex308 as digital audio data by the audio processing unit ex305.

The multiplexer/demultiplexer ex308 multiplexes the coded picture data supplied from image encoding unit ex312 with the audio data supplied from audio processing unit ex305. The resulting multiplexed data is then spectrum-spread by modulator/demodulator unit ex306, D/A conversion and frequency conversion are applied by the communication circuit ex301, and the signal is then transmitted from antenna ex201.

If data from a video file accessed from a web site on the Internet when in the data communication mode is received, the signal received from the base station ex110 via antenna ex201 is despread by modulator/demodulator unit ex306, and the resulting multiplexed data is sent to the multiplexer/demultiplexer ex308.

To decode the multiplexed data received through antenna ex201, multiplexer/demultiplexer ex308 demultiplexes the multiplexed data to separate the encoded video data bitstream and the encoded audio data bitstream. The encoded video data bitstream is then supplied to the image decoding unit ex309 and the encoded audio data bitstream is supplied to the audio processing unit ex305 by way of synchronization bus ex313.

The image decoding unit ex309 has the same configuration as the image decoding apparatus described in the above embodiments. It produces reconstructed video data by decoding an encoded video data bit stream using a decoding method corresponding to the coding method described above, and supplies the decoded video data through LCD controller ex302 on display unit ex202. Video data in a video file accessed from a web page on the Internet can thus be displayed. The audio processing unit ex305 also converts the audio data to an analog audio signal at the same time, and supplies the result to the speaker ex208. Audio data contained in a video file accessed from a web site on the Internet can thus also be reproduced from the speaker.

Figure 30:
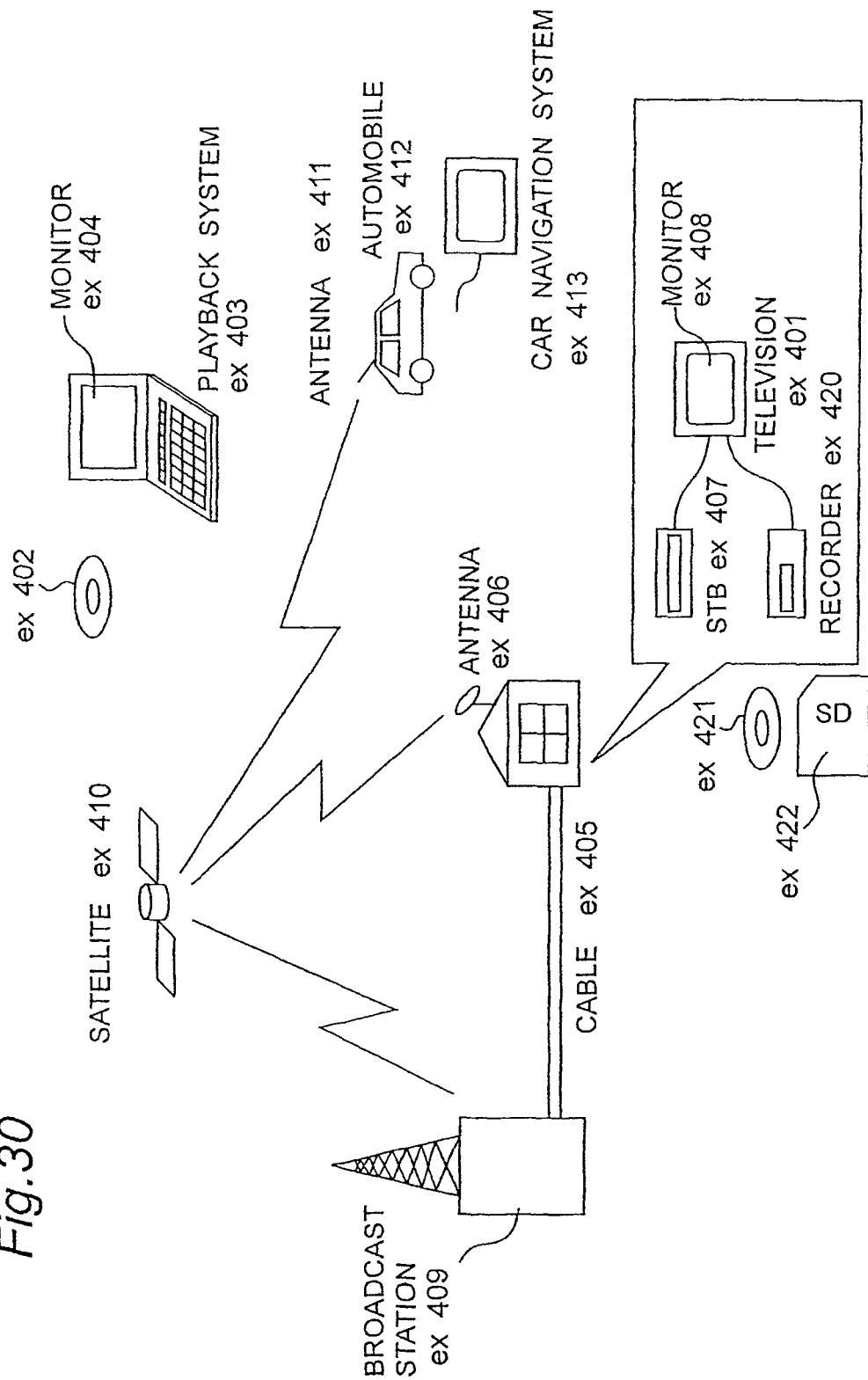
FIG. 30 shows an example of a digital broadcasting system.

The communication system of the present invention shall not be limited to the above configuration. This system could, for example, be adapted to a digital broadcasting system as shown in FIG. 30 using the image encoding apparatus and/or the image decoding apparatus of the present invention to access digital broadcasts transmitted via satellite or terrestrial networks.

More specifically, broadcast station ex409 transmits an encoded video data bit stream via radio waves to a communication or broadcast satellite ex410. The broadcast satellite ex410 receiving this transmission transmits the broadcast signal, which is received by an antenna ex406 in a home, for example, with a satellite broadcast receiver. The encoded bit stream is then decoded and reconstructed by the television receiver ex401, set-top box (STB) ex407, or other device.

The video decoding apparatus of the present invention can also be implemented in a playback device ex403 for reading and decoding an encoded bit stream recorded to a recording medium such as a CD, DVD, or other storage medium ex402. In this case the reconstructed video signal is presented on a monitor ex404, for example.

The image decoding apparatus of the invention could also be built in to a set-top box ex407 connected to a satellite or terrestrial broadcast antenna ex406 or to a cable antenna ex405 for cable television access. Output from this set-top box ex407 could also be presented on a television monitor ex408.

The image decoding apparatus could alternatively be built in to the television instead of the set-top box.

Signals could also be received from satellite ex410 or base station ex107 by an automobile ex412 having an appropriate antenna ex411, and the decoded video could be presented on the display of a car navigation system ex413 in the automobile ex412.

A video signal could also be coded by a video encoding apparatus according to an embodiment of the present invention and recorded to a data recording medium. More specifically, a DVD recorder could record the image signal to a DVD disc ex421, or a hard disk recorder ex420 could record the image signal. The video signal could further alternatively be recorded to an SD Card ex422. If the recorder ex420 has a video decoding apparatus according to the present invention, it could also play back and present on monitor ex408 video signals recorded to DVD disc ex421, SD Card ex422, or other storage medium.

Figure 29:
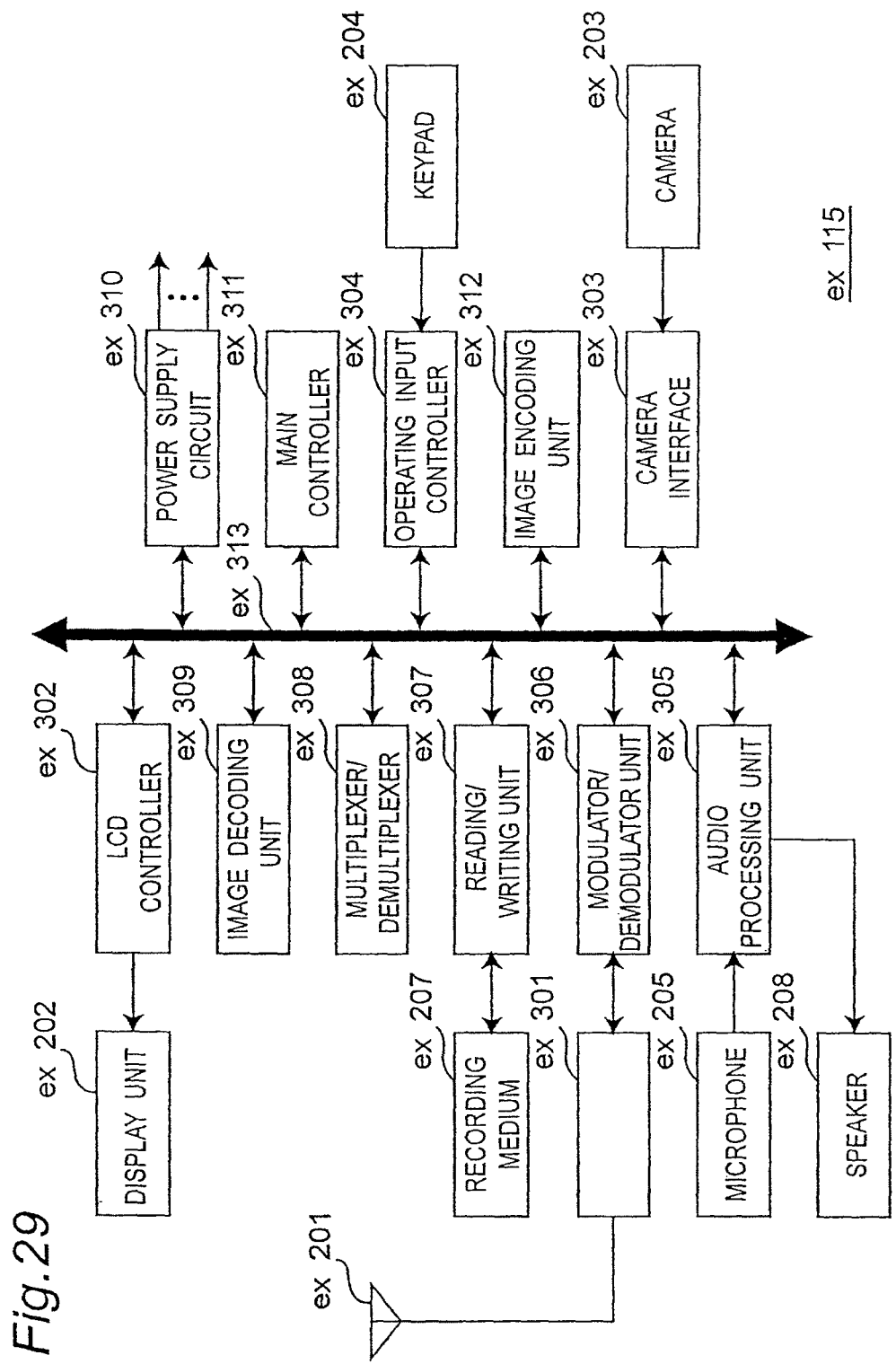
FIG. 29 is a block diagram of a cell phone.

It should be noted that the car navigation system ex413 can be configured without the camera ex203, camera interface ex303, and image encoding unit ex312 shown in FIG. 29. This also applies to the computer ex111 and television (receiver) ex401, for example.

The cell phone ex114 or other terminal could be a transceiver terminal having both the above-described encoder and decoder, or it could be a transmission terminal having only the encoder, or a reception terminal having to only the decoder.

It will also be obvious that the encoding apparatus an decoding apparatus of the present invention shall not be limited to the configurations described in the above first to sixth embodiments, and can be varied in many ways.

The video encoding method and video decoding method described in the above embodiments can thus be used in any of the devices and systems described above, thereby achieving the effects of these embodiments.

The coding distortion removal method of the present invention thus provides a coding distortion removal method with a simple process, a coding, distortion removal method with little likelihood of reducing the image quality of the image signal due to removing coding distortion, and a coding method and decoding method that can reduce the likelihood of degrading the image quality of the image signal as a result of removing coding distortion. The present invention therefore has great practical value.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

We claim:
1. A picture decoding method for decoding coded picture data, which is included in a received video stream, said method comprising:
    decoding coded picture data in the received video stream to obtain a first transform block and an adjacent second transform block in a reconstructed picture having a plurality of blocks forming a moving picture image, said first and second transform blocks being a unit for which a frequency transformation is applied and being motion-compensated, and the first and the second transform blocks having a quantization parameter and a coded motion compensation error equal to zero;
    determining whether the first transform block is located inside a motion-compensation block in which the second transform block is located, the motion-compensation block being a unit for which a motion compensation is applied;
    performing a filtering, using a filter, on pixels in a block boundary between the first and second transform blocks when the first transform block is located outside the motion-compensation block in which the second transform block is located; and
    performing no filtering on the pixels in the block boundary between the first and second transform blocks when the first transform block is located inside the motion-compensation block in which the second transform block is located,
    wherein, in a case of performing a filtering, using a filter, on pixels in a block boundary between the first and second transform blocks when the first transform block is located outside the motion compensation block in which the second transform block is located, said performing a filtering on pixels, using a filter, includes
        obtaining a pixel difference value which is a difference between a pixel value of one pixel adjacent to the block boundary from the first transform block and a pixel value of one pixel adjacent to the block boundary from the second transform block;
        comparing said pixel difference value with a threshold value which is determined based on said quantization parameters of the first and second transform blocks; and
        not removing coding distortion in the pixels in the block boundary between the first and second transform blocks when said pixel difference value is greater than said threshold value,
    wherein a block size of the motion-compensation block is smaller than a block size of the macroblock, and a block size of the motion-compensation block is greater than a block size of each of the first and second transform blocks, and said first and second transform blocks having first and second quantization parameters, respectively, and said quantization parameter is an average of said first and second quantization parameters, and said first and second quantization parameters have a same value when the first and second transform blocks are included in a same macroblock, and said first and second quantization parameters have a different value when the first and second transform blocks are included in a different macroblock, and wherein a coded motion compensation error equal to zero means that transform coefficients in a 4×4 block that has been inter coded are all zero.

\* \* \* \* \*

UNITED STATES PATENT AND TRADEMARK OFFICE
CERTIFICATE OF CORRECTION

PATENT NO. : 9,900,614 B2
APPLICATION NO. : 14/739541
DATED : February 20, 2018
INVENTOR(S) : Shinya Kadono et al.

It is certified that error appears in the above-identified patent and that said Letters Patent is hereby corrected as shown below:

On the Title Page

Page 2, item [56], (Line 13), "Stanclardization" should read -- Standardization --.

Signed and Sealed this
Thirtieth Day of October, 2018

Andrei Iancu
*Director of the United States Patent and Trademark Office*